US009338600B2

(12) United States Patent
Yeung

(10) Patent No.: US 9,338,600 B2
(45) Date of Patent: May 10, 2016

(54) METHOD AND SYSTEM TO COMMUNICATE BETWEEN HOST SYSTEM AND NETWORK OF REMOTE CLIENT COMPUTERS LINKED TO WIRELESS MOBILE COMMUNICATION DEVICES

(71) Applicant: Peter Yeung, Redondo Beach, CA (US)

(72) Inventor: Peter Yeung, Redondo Beach, CA (US)

( * ) Notice: Subject to any disclaimer, the term of this patent is extended or adjusted under 35 U.S.C. 154(b) by 350 days.

(21) Appl. No.: 14/048,041

(22) Filed: Oct. 8, 2013

(65) Prior Publication Data

US 2015/0101019 A1    Apr. 9, 2015

(51) Int. Cl.
*H04W 12/06* (2009.01)
*H04W 4/02* (2009.01)

(52) U.S. Cl.
CPC ..................................... *H04W 4/023* (2013.01)

(58) Field of Classification Search
None
See application file for complete search history.

(56) References Cited

U.S. PATENT DOCUMENTS

| 2004/0116119 | A1* | 6/2004 | Lewis | G06Q 20/102 455/435.1 |
| 2008/0279133 | A1* | 11/2008 | Bienfait | H04W 8/18 370/315 |
| 2009/0227276 | A1* | 9/2009 | Agarwal | H04W 8/30 455/466 |
| 2010/0002700 | A1* | 1/2010 | Simpson, Jr. | H04L 29/12783 370/392 |
| 2015/0195675 | A1* | 7/2015 | Larkin | H04W 4/02 455/456.3 |

* cited by examiner

*Primary Examiner* — Kenny Lin

(57) ABSTRACT

Embodiments of a system and method allowing a host system to select among a plurality of Remote Client Computers (RCC) the one RCC that is wirelessly coupled to and closest to a specific Wireless Mobile Communication Device (WMCD) to communicate with are described. The coupling between the RCC and the WMCD is for the purpose of determining which RCC in the network the server should send the data to and receive from. The process is executed on a host server computer coupled to a plurality of RCC over either a wireless or wired network. The server computer detects the presence and precise location of a WMCD using a system of wireless sensors. Once the precise location of the WMCD is determined, the server system selects among a plurality of RCC the one RCC that is wirelessly coupled to and closest to a specific WMCD to communicate with.

55 Claims, 11 Drawing Sheets

METHOD AND SYSTEM TO COMMUNICATE BETWEEN HOST SYSTEM AND NETWORK OF REMOTE CLIENT COMPUTERS LINKED TO WIRELESS MOBILE COMMUNICATION DEVICES

UTILITY PATENT SPECIFICATIONS

This application claims the benefit of U.S. Provisional Application No. 61/710,782, filed—Oct. 8, 2012

CROSS-REFERENCE TO RELATED APPLICATIONS

Not Applicable

STATEMENT REGARDING FEDERALLY SPONSORED RESEARCH OR DEVELOPMENT

The invention in this patent application is not related to federally sponsored research and development.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present invention relates to a system and method allowing a host system to select among a plurality of remote client computers the one remote client computer that is wirelessly coupled to and closest to a specific Wireless Mobile Communication Device (WMCD) to communicate with.

(1) Field of the Invention
Technical Field
(2) Description of Related Art Including Information Disclosed Under 37 CFR 1.97 and 1.98.

The present invention relates to two existing devices, the wireless mobile communication device (WMCD) operating in a wireless local area network (WLAN) and the wireless communication data router.

Today's popular technology allows a WMCD to exchange data or connect to a WLAN or the Internet wirelessly using radio waves. These WMCD can connect to a network resource such as a WLAN or the Internet via a wireless network access point. Such an access point has a range of about 20 meters (65 feet) indoors and a greater range outdoors. Hotspot coverage can comprise an area as small as a single room with walls that block radio waves, or as large as many square miles achieved by using multiple overlapping access points. The typical use of these WMCD includes directly coupling to a WLAN or the Internet to access data, images or other forms of digital communication.

There are limitations to using these mobile devices, which include smartphones and digital tablets, with typical dimensions about 4.9"×2.3" and 9.5"×7.3", respectively. While these mobile devices can perform a number of communication and other digital functions, these mobile devices are by their nature relatively small in size. There remains a general need for a routing system and method that would allow the user of a WMCD to have user-selected data items or portions thereof to be displayed in a fixed location of a large digital monitor, for example 18" in height and ×27" in width, that is coupled to the WMCD. The larger digital monitor would provide greater details of the visual images, more viewing area, and improved ergonomics for the user compare to the small display monitors typical of smartphones and digital tablets.

The wireless router forwards data packets wirelessly between computer networks, creating an overlay internetwork but also includes the functions of a wireless access point. It is commonly used to provide access to the Internet or a computer network. It can function in WLAN, or in a mixed wired/wireless network, depending on the manufacturer and model.

Several limitations are encountered when the WMCDs are utilized in the aforementioned manner. One limitation is that a user would not be able to couple together two or more wireless communication devices to use one common authorized communication channel between the between the host service and the wireless routing system, the host services then communicating data to the wireless router system for the two separate but coupled wireless mobile communication device. Another drawback is due to the lack of continuity of communication data when a wireless mobile communication device is relocated from one signal coverage area of one wireless router to an adjacent signal coverage area of another wireless router without using a router repeater. Using a repeater has the disadvantage of essentially reducing the bandwidth by one-half, as well as not having a unique IP address.

There is a need for a WMCD to communicate data to a host service via coupling to a wireless remote client computer that is linked to a network that in turn is linked to the host service There is also a need to provide the option to communicate data to and from the host service through 1) input and output of data from the WMCD coupled to the wireless remote client computer in a network, then coupled to and from the wireless router, then coupled to a network then coupling to the host service, 2) while the WMCD is coupled to the remote client computer, the system allows the host service to establish a secure connection with the WMCD and the wireless remote computer client, with input of data from and output of data to the wireless remote client computer, or 3) while the WMCD is coupled to the wireless remote client computer, the system allows the host service to establish a secure connection with the WMCD and the wireless remote client computer, with the input and output of data from either WMCD or wireless remote client computer.

There is an additional need for a wireless router system that allows the WMCD to be mobile within the network and allow the WMCD to be continuously coupled to the network as the WMCD is relocated across the signal coverage areas of multiple wireless remote client computers, while at the same time also being coupled to the nearest or designated wireless remote client computer.

BRIEF SUMMARY OF THE INVENTION

The present invention overcomes the problems noted above and satisfies the needs in this field for a system and method of routing data items from a host system to both a user's wireless mobile communication device and wireless remote client computer. A further aspect of the invention relates to a system and method for routing information or data items between the host services and wireless mobile communication device while simultaneously routing information or data items between the host service and a wireless remote client computer that is coupled to the wireless mobile communication device. Another aspect of the invention relates to the ability for relocation of the wireless mobile communication device from one signal coverage area of a wireless remote client computer to the signal coverage area of another wireless remote client computer within the network while the wireless mobile communication device continues to be coupled to the network of wireless routers, the network system, and host services.

The routing system and method also provide for pushing of data items to the wireless mobile communication device, facilitating "always on, always connected" functionality of the mobile device.

As used in this application the term host system can refer to one or more computer systems linked via a local area network (LAN), a wide area network (WAN) or some virtual private network (VPN) arrangement. The host system is combined through a common association, like a corporate enterprise computer system, an Internet Service Provider (ISP) or an value-added Internet Service like AOL. On the host system, there can be one or more host services operating. Any one of these host services might offer wireless access through the wireless router being disclosed in this application. Host services could be e-mail, calendar, and web page access or more complicated financial host services, stock trading host services or database access host services. The host service may or may not employ a 'push method' to enhance the mobile experience for the user.

Host software programs can run in a corporate environment, in an ISP (Internet Service Provider) environment, in an ASP (Application Service Provider) environment, or many other environments as long as Internet connectivity is available. In accordance with an aspect of the invention, data items are pushed to the wireless mobile communication device through a routing system, which implements an associated routing method. The host system performing the data exchange is preferably repackaging the user's data items for transparent delivery to the mobile data device through the routing system. Any types of data items can be supported this way including data like: E-mail messages, calendar events, meeting notifications, address entries, journal entries, personal reminders, voice-mail messages, voice-mail notifications, database updates, video clips, music clips, audio files, ring tones, Java programs, software updates, games and any other computer-related data having a digital format.

An advantage of the present invention is that it may provide a system and method for continuously routing all forms of pushed information from a host system to a wireless mobile communication device that is coupled to a wireless remote client computer. A further advantage of the invention is the provision of host systems in a rapid manner and providing worldwide access to mobile subscribers of a given host service to enable the mobile subscribers to use their wireless mobile communication device coupled to the wireless remote client computer. Other advantages of the routing aspects of the present invention include: (1) flexibility for the wireless mobile communication device to be relocated from one signal coverage area of a wireless remote client computer to the signal coverage area of another wireless remote client computer while continuing to be coupled to the network of wireless routers, host system, and host services; (2) the ability for the user of the wireless mobile communication device to use a much larger communication device to view the digital displays of data and images in larger dimensions and or in greater visual detail; (3) capability to provide specific information to the user of the wireless mobile communication device based on the estimated location of the wireless mobile communication device (e.g. visual signs to direct the user to turn left or right in order to navigate to a particular location from a remote client computer display monitor); (4) ability to record the amount of time spent and data input submitted by and data output provided to the user in the signal coverage area of any given wireless remote client computer; (5) flexibility for a user of the wireless mobile communication device in a given signal coverage area of a wireless remote client computer to communicate with another user of a wireless mobile communication device in the signal coverage area of the same or different wireless remote client computer; (6) the ability to coordinate simultaneous communication among and provision of data for multiple users in the network using either the wireless mobile communication devices, the wireless remote client computers or a combination of both; (7) the routing system and method routes data items without regard to their content, thereby providing for end-to-end security and effectively extending a firewall, for host systems or other gateways located behind the firewall, to the mobile device; and (8) the routing system acts as a single demultiplexing point for all wireless mobile communication device traffic coupling to the wireless remote client computers, thus facilitating and simplifying billing and provisioning.

Other advantages of the routing aspects of the present invention include: (1) flexibility in coupling gateways, some of which are located behind a company firewall, to one or more network systems; (2) the provision of a central routing point or system solves the problem of pushing data to mobile devices on behalf of all gateways; (3) transparent repackaging and routing of the user data items in a variety of ways such that the mobile data communication device appears as though it were the host system; (4) a single routing system routes data items between pluralities of different networks; (5) the routing system and method routes data items without regard to their content, thereby providing for end-to-end security and effectively extending a firewall, for host systems or other gateways located behind the firewall, to the mobile device; (6) integration with other host system components such as E-mail, TCP/IP, keyboard, screen saver, web-pages and certain programs that can either create user data items or be configured to provide trigger points; and (7) the routing system acts as a single demultiplexing point for all mobile traffic, thus facilitating and simplifying billing and provisioning.

items between a first plurality of communication networks and a second plurality of communication networks, the routing system comprises receiver means for receiving data items from sending systems operating in any of the first plurality of communication networks, transmitter means for transmitting the received data items to destination systems operating in any of the second plurality of communication networks, and routing means for forwarding the received data items from the receiver means to the transmitter means, whereby a single routing system routes data items between sending systems and destination systems operating within different pluralities of communication networks.

In a related embodiment, the invention comprises a routing method for routing data items between any of a first plurality of communication networks communicating with wireless mobile communication devices that are coupled with wireless remote client computers and any of a second plurality of communication networks with wireless mobile communication devices that are coupled with wireless remote client computers, the routing method comprising the steps of providing a receiving arrangement for receiving data items from sending systems operating in any of the first plurality of communication networks, providing a transmitting arrangement for transmitting the received data items to destination systems operating in any of the second plurality of communication networks, and forwarding the received data items from the receiving arrangement to the transmitting arrangement, wherein data items are routed between any communication networks within different pluralities of communication networks by a single receiving arrangement and a single transmitting arrangement.

At least one of the first and second pluralities of communication networks preferably includes wireless communication networks. In further preferred embodiments, the first plurality of communication networks comprises communication networks of different types and the second plurality of communication networks comprises communication networks of further different types.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE SEVERAL VIEWS OF THE DRAWINGS

The present invention satisfies the needs noted above as will become apparent from the following description when read in conjunction with the accompanying drawings wherein.

DETAILED DESCRIPTION OF THE INVENTION

Figure 1:
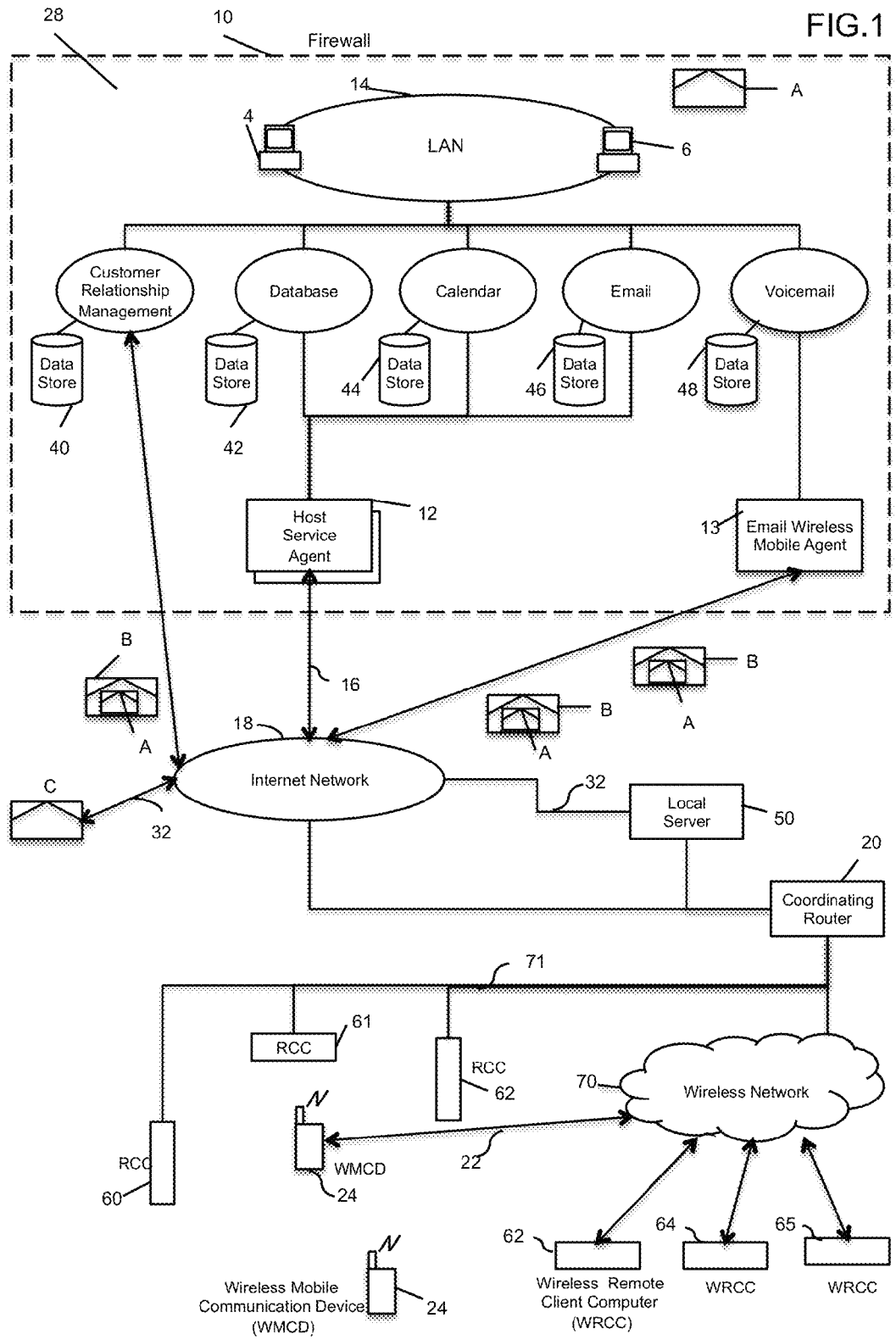
FIG. 1 is a system diagram showing the environment where the present invention works with an example application, an enterprise server software being used to push user data items from a user's mailbox (i.e. a mailbox maintained by a corporate mail server running within the corporate LAN) to the remote client computer coupled to and nearest the WMCD being operated by the user.

Referring now to the drawings, FIG. 1 is an example system diagram showing the redirection of user data items (such as message A or C) from a corporate enterprise computer system (host system) to one of the plurality of remote client computers 61 that is coupled to and nearest to the user's WMCD 24 via the present invention, the coordinating router 20. The coordinating router 20 provides the combination of wired and wireless connective functionality as it acts to both abstract most of the wired network 71 and wireless network 70 complexities, and it also implements feature necessary to support transmitting data to and receiving data from one of the plurality of the remote client computer 61 that is coupled to and nearest to the user's WMCD 24. The purpose of the coupling between the remote client computer 61 and the WMCD 24 is so that the host system knows which one of the plurality of remote client computers in the network to send and receive data from. The user with physical possession of the WMCD 24 would be able to communicate with the host system via the remote client computer with inputs through touchscreen, keyboard input, or touchless input with a wireless sensor or via the WMCD with inputs through touchscreen, keyboard input, or touchless input with a wireless sensor. Although not shown, a plurality of WMCD may access data from the corporate enterprise computer network system. In this example, message A in FIG. 1 represents an internal message sent from desktop 6 to any number of server computers in the corporate LAN 14, including a database server 42, a calendar server 44, an E-mail server 46 or a voice-mail server 48. Message C in FIG. 1 represents an external message from a sender that is not directly connected to LAN 14, such as one of the plurality of remote client computers 61 that is coupled to and nearest to the user's WMCD 24, another one of the plurality of remote client computers that is coupled to and nearest to the user's WMCD (not shown), or any user connected to the Internet 18. Message C could be e-mail, voice-mail, calendar information, database updates, web-page updates or could even represent a command message from one of the plurality of remote client computers 61 that is coupled to and nearest to the user's WMCD 24 to the host system 28. The host system 28 preferably includes, along with the typical communication links, hardware and software associated with a corporate enterprise computer network system, one or more wireless mobility agents 12, a TCP/IP connection 16, a collection of datastores 40-48, (i.e. for example a data store for e-mail could be an off-the-shelf mail server like Microsoft Exchange®, Server or Lotus Notes® Server), all within and behind a corporate firewall 10.

Figure 3:
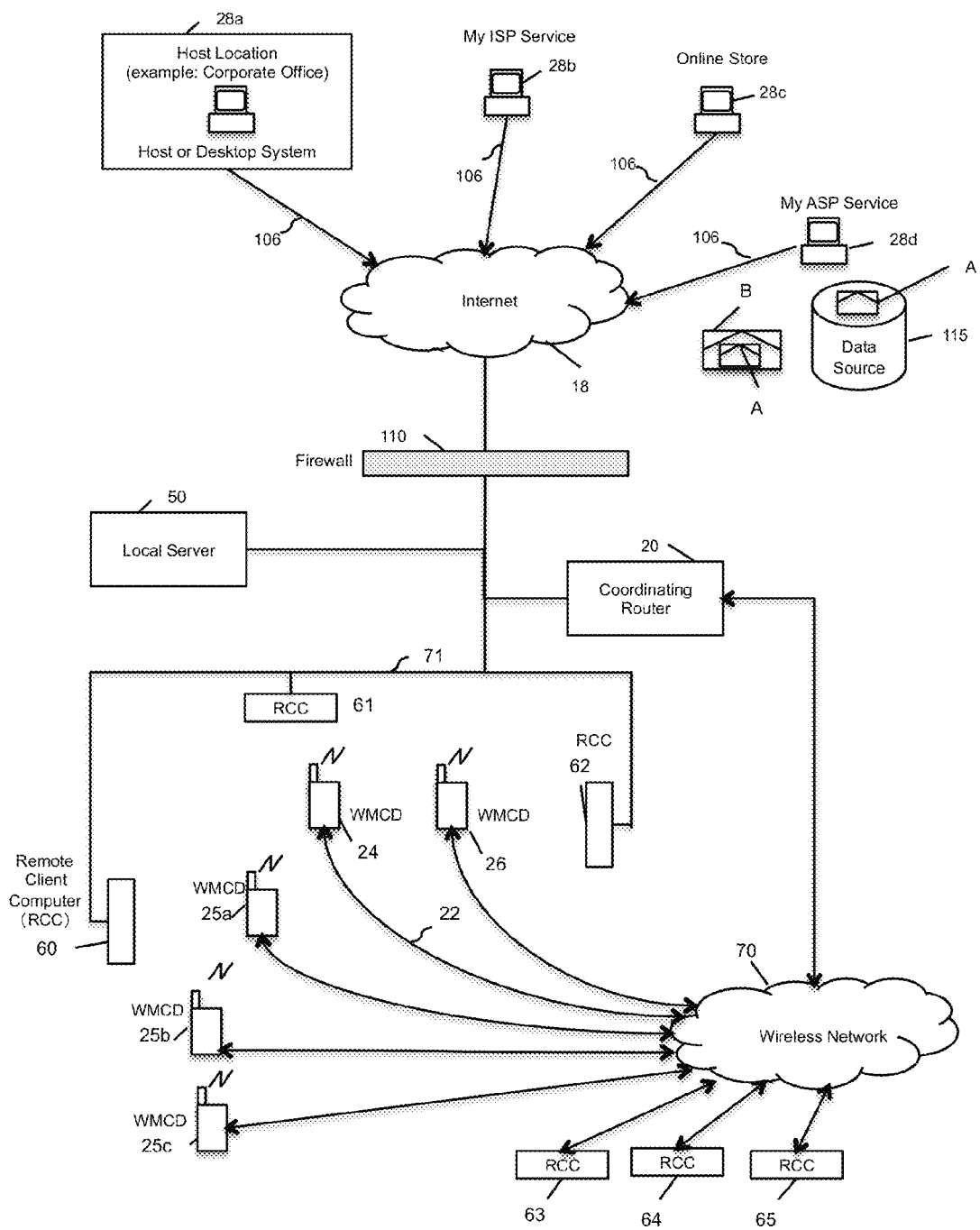
FIG. 3 is a system diagram showing a more detailed and complex environment where the present invention can be used. In this figure the present invention is dealing with a wide range of host services and many wireless networks with more types of host services.

FIG. 1 shows the present invention being used within the corporate enterprise network environment, which is just one embodiment showing one type of host service 12 that offers push-based messages for one of the plurality of remote client computers 61 that is coupled to and nearest to the user's WMCD 24 that is capable of notifying and preferably presenting the data to the user in real-time at another of the plurality of remote client computers that is coupled to and nearest to the user's WMCD when data arrives at the host system. FIG. 3 also shows a more detailed and complex environment with more types of host services. By using the coordinating router 20 an important set of advantages are realized.

By offering the coordinating router 20 there are a number of major advantages to both the host service 12 and the wireless network 70. As mentioned earlier a host service 40-48 is considered to be any computer program that is running on one or more computer systems 28. The host service 40-48 is said to be running on a host system 28, and one host system 28 can support any number of host services 40-48. A host service 48 may or may not be aware of the fact that information is being channeled to one of the plurality of remote client computers 61 that is coupled to and nearest to the user's WMCD 24. For example an e-mail program 46 might be receiving and processing e-mail while an associated program (e-mail wireless mobility agent 13) is also monitoring the mailbox 46 and forwarding or pushing the same e-mail to one of the plurality of remote client computers 61 that is coupled to and nearest to the user's WMCD 24. A host service 40 might also be modified to prepared and exchange information with one of the plurality of remote client computers 61 that is coupled to and nearest to the user's WMCD 24 via the coordinating router 20, like customer relationship management software 40. In a third example there might be a common access to arrange of host services 42-46. For example a mobility agent 12 might offer a Wireless Access Protocol (WAP) connection to several databases.

Figure 2:
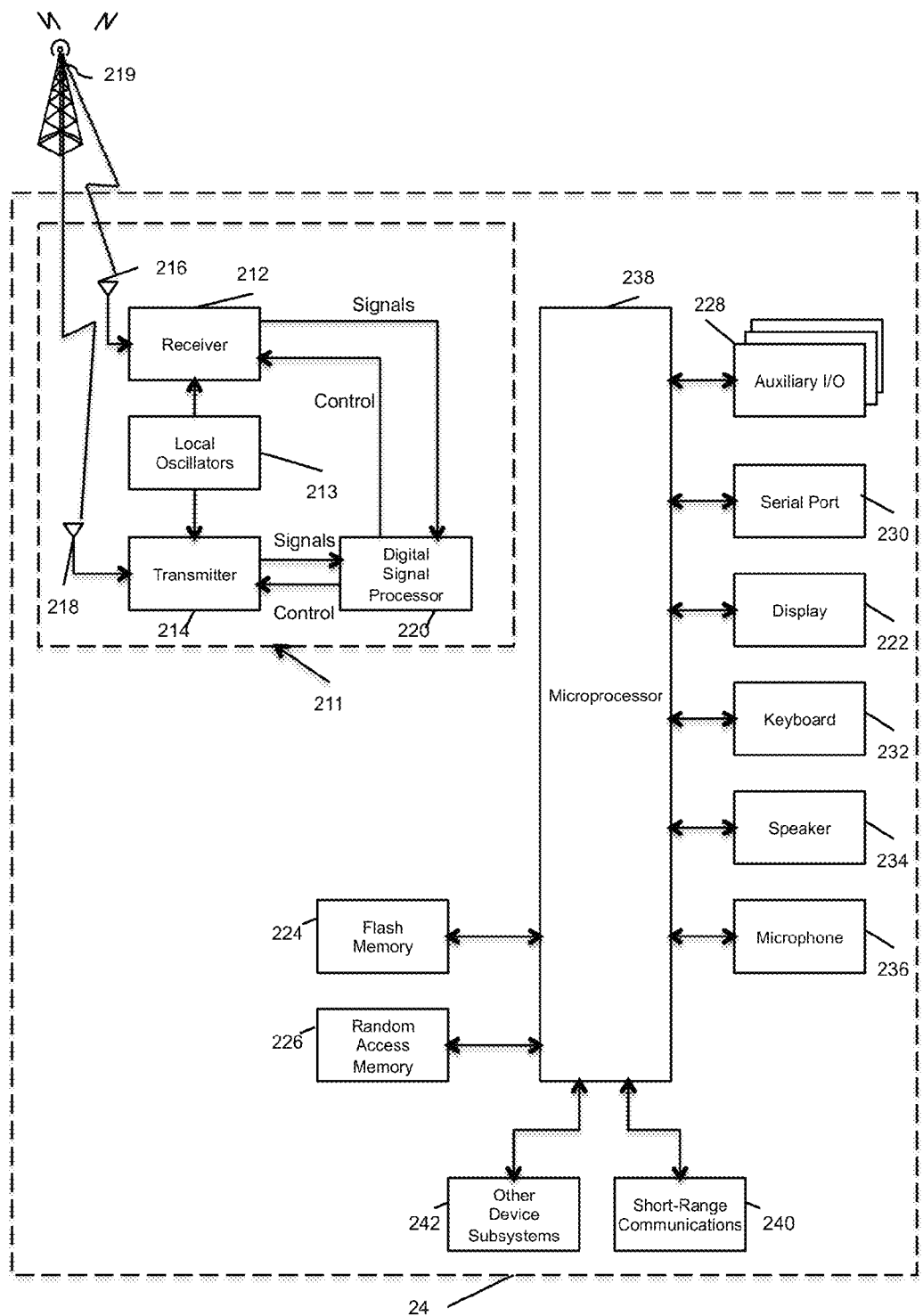
FIG. 2 is an illustration showing all the components within a dual-mode WMCD that can be used with this application.

A preferred WMCD 24 can either be: a hand-held two-way wireless paging computer as described in detail in FIG. 2, a wirelessly enabled palm-top computer, a mobile telephone with data messaging capabilities, a digital tablet with mobile phone and Internet capabilities, a PDA with mobile phone capabilities, or a wirelessly enabled laptop computer, a vending machine with an associated OEM radio modem, a wirelessly-enabled heart-monitoring system or, alternatively it could be other types of WMCD capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. In this limited data messaging environments, the present invention 20 still could abstract one of the plurality of remote client computers 61 that is coupled to and nearest to the user's WMCD 24 and wireless network 70, offer push services to standard web-based server systems and allow a host service 28 to reach one of the plurality of remote client computers 61 that is coupled to and nearest to the user's WMCD 24. The WMCD 24 includes software program instructions that work in conjunction with a destination host service 28 or wireless mobility agent 12 shown in FIG. 1.

A host service 28 using the coordinating router 20 has many methods when establishing a communication link to the coordinating router 20. For one skilled in the art of data communications the host services 28 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host services 28 that might employ the coordinating router 20 to perform push could include: field service applications, e-mail services, stock quote services, banking services, stocktrading services, field sales applications, advertising messages and many others. This wireless network 70 abstraction is made possible by the coordinating router 20, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 28, or that the host system 28 acquires through the use of intelligent agents, such as data that is received after the host system 28 initiates a search of a database or a website or a bulletin board. In some instances, only a portion of the data item is transmitted to the WMCD 24 in order to minimize the amount of data transmitted via the wireless network 70. In these instances, one of the plurality of remote client computers 61 that is coupled to and nearest to the user's WMCD 24 can optionally send a command message to the host service 40, 12 and 14 to receive more or the entire data item if the user desires to receive it. The coordinating router 20 provides a range of services to make creating a push-based host service straightforward, which is essential to the success of wireless data networks. These networks can include: (1) the Code Division Multiple Access (CDMA) network that has been developed and operated by Qualcomm, (2) the Groupe Special Mobile or the Global System for Mobile Communications (GSM) and the General Packet Radio Service (GPRS) both developed by the standards committee of CEPT, and (3) the third-generation (3G) networks like EDGE and UMTS. GPRS is a data overlay on top of the very popular GSM wireless network, operating in virtually every country in Europe. Some older examples of data-centric network include, but are not limited to: (1) the Mobitex Radio Network ("Mobitex"), which has been developed by Eritel and Ericsson of Sweden, and is operated by Cingular Corporation in the United States, and (2) the DataTAC Radio Network ("DataTAC"), which has been developed by Motorola and isoperated by Motient Corporation, in the United States.

To be effective in providing push services for host systems 28 the coordinating router 20 preferably implements a set of defined functions that solve one or more problems plaguing the art of wireless connectivity. For one skilled in the art, it is clear that one could select many different hardware configurations for the coordinating router 20, but preferably the same or similar set of features would be present in the different configurations. The coordinating router 20 offers the following one or more features for host services: 1) Implements an addressing method so that one of the plurality of remote client computers 61 that is coupled to and nearest to the user's WMCD 24 traffic can be addressed to a host service 40, 12 and 14 without the need for the wireless network 70 to assign an identity to each host service 40, 12 and 14. This is a start to solving the abstraction problem for the host service 40, 12 and 14. 2) An efficient and authenticated method for the host service 20, 12 and 14 to initiate a communication connection to the coordinating router 20 for the purposes of opening a communication tunnel to the one or more of the plurality of remote client computers that is coupled to and nearest to the user's WMCD 24 that the host service 40, 12 and 14 wishes to communicate with. 3) A reliable method for exchanging data between the host service 40, 12 and 14 and one of the plurality of remote client computers 61 that is coupled to and nearest to the user's WMCD 24, in a manner consistent with the abilities of the wireless network 70. 4) Providing feedback to the host service 40, 12 and 14 when data is delivered. This allows the host service 40, 12 and 14 to clean up any wireless delivery queues if necessary, or inform the original sender (user or program) that the data has been delivered to the one of the plurality of remote client computers 61 that is coupled to and nearest to the user's WMCD 24. 5) Implementation of a wireless network 70 initiated push of services or data to one of the plurality of remote client computers 61 that is coupled to and nearest to the user's WMCD 24, from a coordinating router 20. The one of the plurality of remote client computers 61 that is coupled to and nearest to the user's WMCD 24 user preferably should not have to perform any special actions to receive the asynchronous messages sent from the host services 40, 12 and 14. 6. Connect to a wide range of wireless networks 70 and provide a way of tracking the user's location so that a 'follow you anywhere' solution can be provided. These features will be expanded and described in detail in FIGS. 3-8.

Turning now to FIG. 2 there is a block diagram of a WMCD 24 which can support the coordinating router 20, which is the present invention. The WMCD 24 is preferably a two-way communication device having at least data communication capabilities. The WMCD 24 preferably has the capability to communicate with other computer systems on the Internet. Depending on the functionality provided by the WMCD 24, the WMCD 24 may be referred to as a data messaging device, a two-way pager, a cellular telephone with data messaging capabilities, a wireless Internet appliance or a data communication device (with or without telephony capabilities).

Where the WMCD 24 is enabled for two-way communications, the WMCD 24 will incorporate a communication subsystem 211, including a receiver 212, a transmitter 214, and associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the WMCD 24 is intended to operate. For example, a WMCD 24 destined for a North American market may include a communication subsystem 211 designed to operate within the Mobitex mobile communication system or DataTAC mobile communication system, whereas a WMCD 24 intended for use in Europe or Asia may incorporate a General Packet Radio Service (GPRS) communication subsystem 211.

Network access requirements will also vary depending upon the type of network 219. For example, in the Mobitex and DataTAC networks, WMCD such as 24 are registered on the network using a unique personal identification number or PIN associated with each WMCD 24. In GPRS networks however, network access is associated with a subscriber or user of a WMCD 24. A GPRS WMCD 24 therefore requires a subscriber identity module (not shown), commonly referred to asa SIM card, in order to operate on a GPRS network. Without a SIM card, a GPRS WMCD 24 will not be fully functional. Local or non-network communication functions (if any) may be operable, but the WMCD 24 will be unable to carry out any functions involving communications over network 219. When required network registration or activation procedures have been completed, a WMCD 24 may send and receive communication signals over the network 219. Signals received by the antenna 216 through a communication network 219 are input to the receiver 212, which may perform such common receiver functions as signal amplification, frequency down conversion, filtering, channel selection and the like, and in the example system shown in FIG. 2, analog to digital conversion. Analog to digital conversion of a received signal allows more complex communication functions such as demodulation and decoding to be performed in the DSP 220. In a similar manner, signals to be transmitted are processed, including modulation and encoding for example, by the DSP 220 and input to the transmitter 214 for digital to analog conversion, frequency up conversion, filtering, amplification and transmission over the communication network 219 via the antenna 218. The DSP 220 not only processes communication signals, but also provides for receiver and transmitter control. For example, the gains applied to communication signals in the receiver 212 and transmitter 214 may be adaptively controlled through automatic gain control algorithms implemented in the DSP 220.

The WMCD 24 preferably includes a microprocessor 238, which controls the overall operation of the WMCD 24. Communication functions, including at least data and voice communications, are performed through the communication subsystem 211. The microprocessor 238 also interacts with further WMCD 24 subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other WMCD 24 subsystems generally designated as 242.

Some of the subsystems shown in FIG. 2 perform communication-related functions, whereas other subsystems may provide "resident" or on-device functions. Notably, some subsystems, such as keyboard 232 and display 222 for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read only memory (ROM) or similar storage element (not shown). Those skilled in the art will appreciate that the operating system, specific WMCD 24 applications, or parts thereof, may be temporarily loaded into a volatile store such as RAM 226. It is contemplated that received communication signals may also be stored to RAM 226.

The microprocessor 238, in addition to its operating system functions, preferably enables execution of software applications on the WMCD 24. A predetermined set of applications, which control basic WMCD 24 operations, including at least data and voice communication applications for example, will be normally installed on the WMCD 24 during manufacture. A preferred application that may be loaded onto the WMCD 24 may be a personal information manager (PIM) application having the ability to organize and manage data items relating to the WMCD 24 user such as, but not limited to e-mail, calendar events, voice mails, appointments, and task items. Naturally, one or more memory stores would be available on the WMCD 24 to facilitate storage of PIM data items on the WMCD 24. Such PIM application would preferably have the ability to send and receive data items, via the wireless network. In a preferred embodiment, the PIM data items are seamlessly integrated, synchronized and updated, via the wireless network, with the WMCD 24 user's corresponding data items stored or associated with a host computer system. Further applications may also be loaded onto the WMCD 24 through the network 219, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the WMCD 24 and may provide enhanced on-device functions, communication-related functions, or both. For example, secure communication applications may enable electronic commerce functions and other such financial transactions to be performed using the WMCD 24.

In a data communication mode, a received signal such as a text message or web page download will be processed by the communication subsystem 211 and input to the microprocessor 238, which will preferably further process the received signal for output to the display 222, or alternatively to an auxiliary I/O device 228. A user of WMCD 24 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211.

For voice communications, overall operation of the WMCD 24 is substantially similar, except that received signals would preferably be output to a speaker 234 and signals for transmission would be generated by a microphone 236. Alternative voice or audio I/O subsystems such as a voice message recording subsystem may also be implemented on the WMCD 24. Although voice or audio signal output is preferably accomplished primarily through the speaker 234, the display 222 may also be used to provide an indication of the identity of a calling party, the duration of a voice call, or other voice call related information for example.

A serial port 230 in FIG. 2 would normally be implemented in a personal digital assistant (PDA)-type communication device for which synchronization with a user's desktop computer (not shown) may be desirable, but is an optional WMCD 24 component. Such a port 230 would enable a user to set preferences through an external device or software application and would extend the capabilities of the WMCD 24 by providing for information or software downloads to the WMCD 24 other than through a wireless communication network. The alternate download path may for example be used to load an encryption key onto the WMCD 24 through a direct and thus reliable and trusted connection to thereby enable secure WMCD 24 communication.

A short-range communications subsystem 240 is a further optional component that may provide for communication between the WMCD 24 and different systems or devices, which need not necessarily be similar devices. For example, the subsystem 240 may include an infrared device and associated circuits and components or a Bluetooth™ communication module to provide for communication with similarly-enabled systems and devices.

In the preferred embodiment of the present invention, the WMCD is used primarily as a reference point of where the user that is operating the WMCD is located in order to direct data to one of the remote client computers in a network that is coupled to and closest to the WMCD. As the user is envisioned to be ambulatory and capable of relocating to a new geographic location within the operating range of the wired and wireless network, the user would have capability to interact with either a wired or wireless remote client computer that would have greater functionality, capacity or other enhanced benefits that the WMCD does not possess. The preferred embodiment of the present invention allows 1) the user to be mobile and at the same time afford the user of the WMCD the benefit of having the WMCD been authenticated as an authorized device in the system, 2) at the same time permit the user to operate one of the remote client computers in the network that is coupled to and nearby the WMCD. As such, the preferred embodiment of the present invention requires: a) an authenticated WMCD, b) a wired or wireless remote client computer coupled in the network, and 3) the coordinating router coupled to the WMCD in the network.

FIG. 3 is a high-level block diagram of a preferred embodiment of a routing system by which data items are routed to and from the remote client computer 61 and the WMCD 24 in accordance with a further aspect of the invention. FIG. 3 introduces further complexity into the system in which the invention is used. As shown in FIG. 3, information services such as the Wireless Enterprise Server 28a, My ISP Service 28b, and Online Store 28c, and My ASP Service 28d are all connected via WAN 18 to the present invention 20. As described in FIG. 1, it is assumed in this figure that any of these host systems 28 can have one or more wireless enabled host services 40, 12 and 14 running within a computer running at the host system 28. For the remaining parts of this application this relationship will be assumed. The present invention 20 may be distributed across different geographic boundaries for redundancy and fault tolerance. As will be apparent to those skilled in the art, the arrangement shown in FIG. 3 assumes that wireless network 70 is packet-based communication network, although the invention is not limited thereto. Packet-based wireless network 70 is widely used for data transfer and is therefore preferred for implementation of the invention. The WMCD 24 is adapted for communication within wireless network 70 via wireless links 22, as required by each wireless network 70 being used. As an illustrative example of the operation for the present invention 20 shown in FIG. 3, consider a data item A, repackaged in outer envelope B (the packaged data item A now referred to as "data item (A)") and sent to the one of the plurality of remote client computers that is coupled to and nearest to the user's WMCD 24 from an Application Service Provider (ASP) 28d. Within the ASP is a computer program, similar to the wireless mobility agent 12 or 14 in FIG. 1, running on any computer in the ASP's environment that is sending requested data items from a data store 115 to a one of the plurality of remote client computers 61 that is coupled to and nearest to the user's WMCD 24. The mobile-destined data item (A) is routed through the Internet 18, and through the coordinating router 20 firewall protecting the coordinating router 20. Only authorized host systems can exchange data with one of the plurality of remote client computers that is coupled to and nearest to the user's WMCD Device 24, thus reducing the chances of denial of service attacks or other security problems. Each host system is configured and setup by the operator of the coordinating router 20. For one skilled in the art of firewall configuration this can easily be performed through direct operator commands, through a web interface, manually or programmatically. The coordinating router 20 examines the mobile address information contained in the outer envelope B to determine which wireless network 70 to route the data item (A) to the one of the plurality of remote client computers that is coupled to and nearest to the user's WMCD 24. The coordinating router 20 then routes the data item (A) based on the mobile address in envelope B and then transmitted to the one of the plurality of remote client computers that is coupled to and nearest to the user's WMCD 24 over wireless network 70. In this example, the data item A could be an E-Mail sent from an Internet mail account, a calendar event, a database inventory item level, a field service call or other important, 'just-in-time' pieces of data residing primarily at the host system 28d. As shown in subsequent diagrams the coordinating router 20 may also track the location of the WMCD 24 by following incoming traffic patterns, by receiving any information provided by the wireless network 70, and by receiving registration signals from the WMCD 24 when the user changes wireless networks 70. This later case may be performed manually by the user of the WMCD 24, so the RF component of the WMCD 24 can change frequency tables to match the new country being used. At any time a WMCD 24 might roam within wireless network 70, so that a new path is required for data items. The path it takes might involve serious time delay as the user flies to another country or a different part of the same country. During this out-of-coverage blackout, the coordinating router 20 is storing all data items to be eventually transmitted to the WMCD 24, and is periodically attempting to re-send any stored data items to see if the WMCD 24 has returned to a coverage area.

Another major advantage of the coordinating router 20 is that the host services 28 do not have to connect to every wireless network 70 they wish to support. This connection requirement to the wireless network 70 is done once by the present invention 20 and can be used by all host services 28 connecting to the coordinating router 20. This connection to multiple networks could involve similar networks, dissimilar networks, or even different revisions of the same network. For a single company supporting a community of WMCD users, it is very likely that a range of dissimilar WMCD 24 will need support from a single host. The present invention 20 can handle this, insofar as it provides a common access to all dissimilar networks and makes the task of hosting a host service relatively simple. In one embodiment, a network carrier may manage and operate only one wireless network 70, while another network carrier may manage and operate more than one wireless network 70. Hence, the coordinating router 20 facilitates the connectivity into and from one or more network carriers and their respective one or more wireless network 70.

Figure 10:
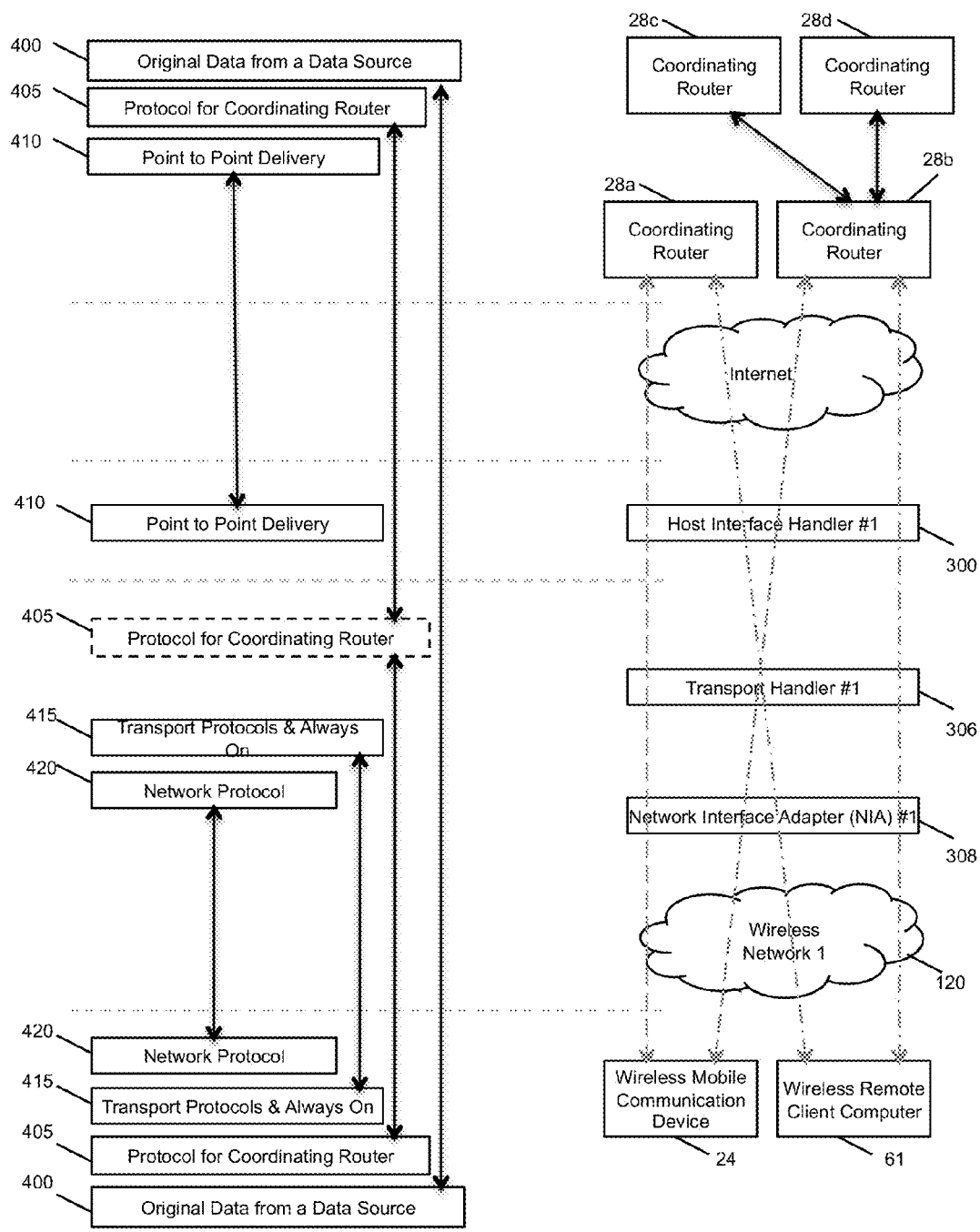
FIG. 10 is a protocol diagram showing how the different protocol layers work between each component and the purpose each protocol layer serves.

To provide this abstraction between the wireless network 70 and the host service 28 the coordinating router 20 implements an addressing and router abstraction methodology. This method results in the wireless network 70 not needing to know about the host service 28, and the host service 28 not needing to know about the wireless network 70. This abstraction is implemented by assigning each host service a Host Service Identifier or "Host Service Id". From the host service's point of view, the Host Service Id effectively replaces an identifier assigned by the wireless network 70. For example, in a Mobitex wireless network, this identifier is called a Fixed Station Terminal (FST) number, in a Datatac wireless network, this identifier could be called a Net ID and in GPRS this identifier could be associated to the Access Point Node (APN). The coordinating router 20 assumes this wireless network-centric address and the host services are given a Host Service Id created by the coordinating router system 20. Each host service 28 that is sold, licensed or enabled to wirelessly provide data to the WMCD is assigned a special Host Service Id number. This could be a string, an IPv4 address, an IPv6 address or a proprietary string. The string is then manually or automatically configured within the coordinating router 20; in preferably a database structure operating at or associated with the coordinating router. As each host service 28 tries to connect and validate itself, the Host Service Id is used to confirm the identity of the host service 28, and to locate the correct database entry for the host service 28. FIG. 10 illustrates a preferable set of the protocol layers to perform this routing and abstraction just discussed. In reference to FIG. 4 this is a detailed diagram showing the components within the coordinating router 20. The components inside of the coordinating router 20 include a component that deals with host service connectivity called the host interface handler (HIH), a component that deals with guaranteed message reception and delivery (wired or wireless transport handler (WWTH)), and a component to deal with all the wireless network connections called the network interface adapter (NIA). Also described are support components that provide work assignments (called the work dispatcher), the billing and registration services component, and a database component that provides continuity, state and configuration information to the entire wireless router system. All the components are preferably tied to a backbone 314, which can be any number of high-speed LAN technologies using Ethernet, Fiber or any other LAN methods available. This high-speed backbone between all the components is designed to distribute the work and provide fault tolerance. For one skilled in the art, there are several off-the-shelf products to provide distributed and fault tolerant work and message queuing systems. The most prominent of these are the IBM® MQ Series products and TIBCO™ Rendezvous products. Such products may, for example, provide an information bus that provides a publish/subscribe architecture that can be used to built redundancy, scalability and other major features. This product is used in many major financial institutions and to power the backbone of portal networks and search engines.

Figure 4:
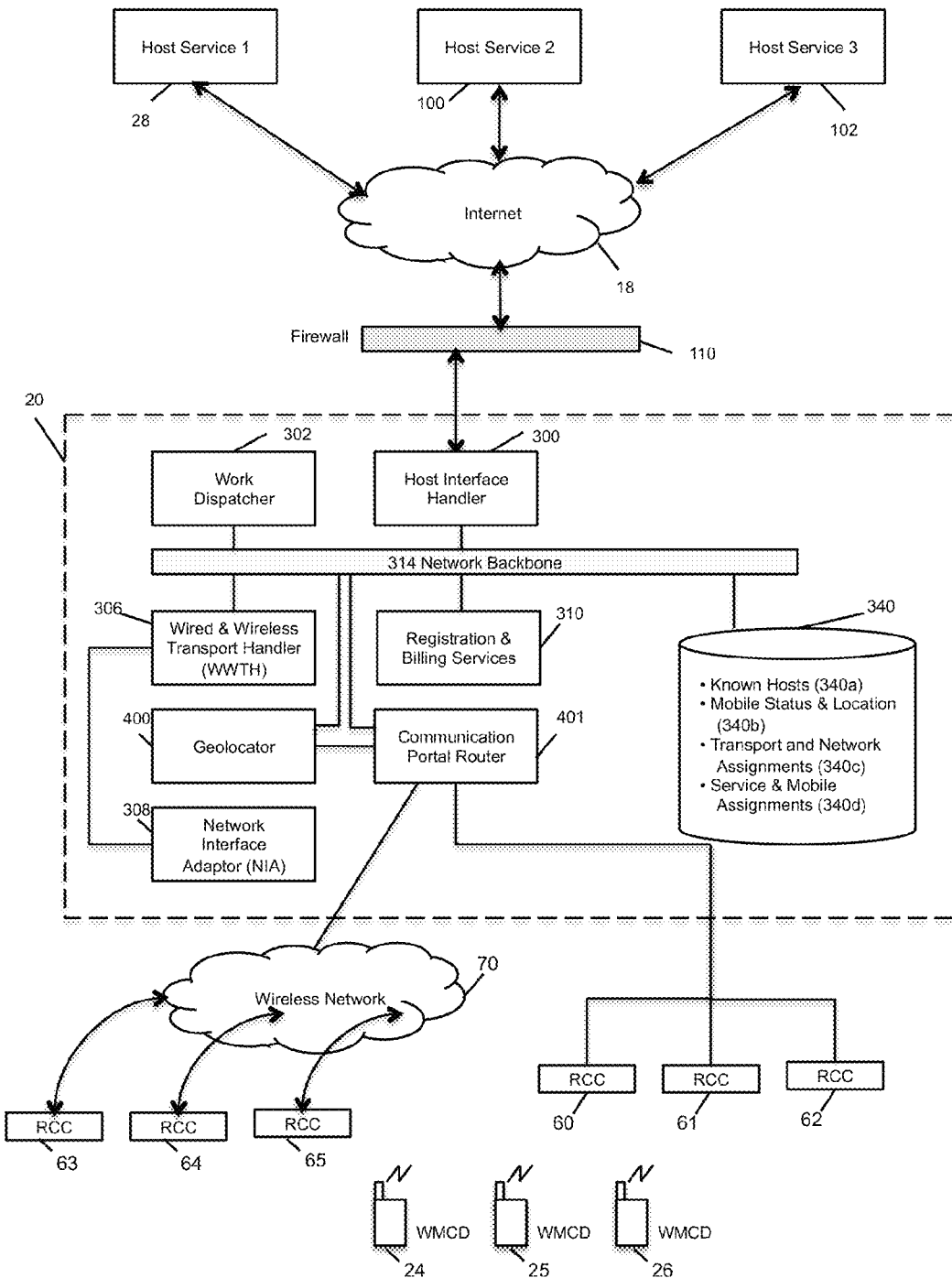
FIG. 4 is a detailed diagram showing one embodiment for the internal components of the present invention.

Turning now to FIG. 4 the first major component that is present but not directly part of the coordinating router 20 is an Internet firewall 110. The firewall 110 acts as a form of protection from Internet hackers that attempt to send data to WMCD 24 without authorization. This firewall preferably may be off-the-shelf and would protect the coordinating router 20 at a lower IP-layer type protocol. Once through the firewall, the host service 28 connects to one of a plurality of host interface handlers (HIHs) 300. There can be any number of HIHs depending on the number of hosts that are configured and required in the system. The method used for this connection and for authorization of the connection is detailed in FIG. 5 as will be described later. The HIH component uses various parts of the database 340 to confirm and register the incoming host connection 28. The known hosts 340a sub-component of the database provides a way of validating that the host is known and marking its state as 'present' once the host is connected and authorized. Preferably, once the host connection is established, a secure and authenticated point-to-point communication connection is ready for the exchange of data between the host system or service and the coordinating router. In an embodiment of the present invention, there are a plurality of such communication connections between the coordinating router and a plurality of host system or services.

The next component that works closely with the HIH 300 is called the wired and wireless transport handler (WWTH) 306. The WWTH 306 takes responsibility for data item transfer to and from the WMCD 24 and one of the plurality of remote client computers that is coupled to and nearest to the user's WMCD 24. Depending on the load of traffic, and the number of remote client computers and WMCD in the system, there may be a plurality of WWTH 306 components operating in the system. The LAN backbone 314, using something like a TIBCO queuing system, combined with the work dispatcher 302, allows each component of the system to scale as large as needed. The WWTH 306 component will be expanded and described further in FIG. 6. The next component is the network interface adapter (NIA) 308, which could have a communications link directly to the WWTH 306, or the NIA 308 could be accessible via the LAN network backbone 314. This alternative embodiment is shown in greater detail in FIG. 6. The NIA 308 provides the direct interface to the wireless network 70 being supported. Since many of the current wireless data networks 70 have unique communication connection requirements, this component preferably buffers the other wireless router components from many of the specific nuances of the particular wireless network it is in communication with. In a preferred embodiment, the NIA 308 isolates the WWTH 306 from much of the details of communication links and physical interface requirements of each wireless network 70. There could be any number of wireless networks 70, all with their own connection methods. In some it could be a proprietary protocol over X.25, like the Mobitex or Datatac networks. In other it could be a proprietary protocol over TCP/IP, like newer version of the Datatac network. In other cases, it could be an IP connection, supporting either a TCP or UDPdata exchange method, like the CDMA, W-CDMA, and GPRS networks.

To further enhance the coordinating router 20 there are other support components that could either exist separate, or be built into a single component. The first of these is the work dispatcher 302. The work dispatcher's 302 role is defined more clearly in FIGS. 5-6. One of the functions of the work dispatcher 302, is to assign a specific WTH 306 to a one of the plurality of remote client computers that is coupled to and nearest to the user's WMCD 24 and the WMCD 24 so that all data items are routed through the same WWTH 306. If a WWTH 306 fails, the work dispatcher 302 finds a new WWTH 306 to take its place. Additionally, if one WWTH 306 becomes too busy or is handling an undesirably large traffic load, the work dispatcher 302 can assign data items that are to be routed to the one of the plurality of remote client computers that is coupled to and nearest to the user's WMCD and the WMCD 24 to instead round robin to multiple WTHs 306. This is one example of how the fault tolerant and scalable system is built, and a fault tolerant queuing system like TIBCO may solve this problem very easily. In the other direction, the work dispatcher 306 finds the correct HIH 300 to accept data items from the remote client computer 61 and the coupled WMCD 24 that the remote client computer 61 is coupled to. Since a host service 28 can preferably connect to any HIH 300, the work dispatcher 306 finds the HIH 300 that has responsibility for or is associated with the host-router communication connection initiated by the correct host service 28, and routes the data appropriately. Recall that each host service 28 connects and is assigned round robin to the next available HIH 300. This process is described in detail in FIG. 5.

The Geolocator 340b identifies the location of the WMCD within the network reference. The Geolocator 340b then searches the database of the geolocation of all the remote client computers in the network to identify the nearest and most suitable remote client computer to the location of the WMCD. Then the network interface adaptor (NIA) 308 will couple with and direct the data to the selected remote client computer. This coupling of remote client computer and the WMCD is maintained as long as the Geolocator determines that the geolocation of the WMCD is the closest to or most suited to the selected remote client computer. There may be situations where the nearest remote client computer is not suitable such as when there is physical barrier like a wall or partition between the WMCD and the remote client computer. In such circumstances, the closest suitable remote client computer will be coupled to the WMCD.

Another preferable component in the coordinating router is the peer-to-peer (P2P) messaging component 304. This component is optional, but provides desirable peer-to-peer message routing facility, which allows one of the plurality of remote client computers that is coupled to and nearest to the user's WMCD to send directly to another of the plurality of remote client computers that is coupled to and nearest to another user's WMCD. The P2P component can perform the functions similar to an Instant Messaging gateway, but in this case for one of the plurality of remote client computers that is coupled to and nearest to the user's WMCD. In some networks, where the WMCD's identity might not be static, one of the plurality of remote client computers that is coupled to and nearest to the user's WMCD cannot easily send a message to another one of the plurality of remote client computers that is coupled to and nearest to another user's WMCD. The coordinating invention 20 has a store and forward structure that permits it to offer SMS and wireless messaging simultaneously to all of the plurality of remote client computers that is nearest to the users' WMCD.

Registration and billing are two other components 310 that have been combined into one area. These two components could be separated or merged; it is the functionality that is important. Registration involves keeping track of all valid WMCD 24 and tracking their location when they make major wireless network 70 changes. These changes are propagated to the associated database 340 and used by the work dispatcher 302 for important work assignment decisions. For example if a WMCD 24 travels to another location away from the current network it might be necessary to move the responsibility of data item delivery to another WTH 306 component. As part of the registration function, the user of the WMCD 24 will be provided with added security. Services and mobile devices must be registered and authenticated before they can exchange data.

The billing component keeps a running tally of the services and amounts of data exchanged among each host service 28, each remote client computer 61 and each WMCD 24. The billing component receives messages via the LAN network backbone. For example by using a TIBCO architecture it would be possible to broadcast billing messages to a group of billing components 310. Depending on the load of traffic multiple billing components 310 could be processing and saving the billing information to the database 340. Each record could have lots of information pertinent to generating complex and relevant billing information. For example it might be possible to save the size of the data exchanged, the time of day, the duration, the type of service access and other key pricing elements. There is a more detailed description of this operation in FIG. 7.

Another optional component would be the additional network interface adapter (NIA) 312 being used for registration and billing 310. This additional NIA 312 is present to ensure that normal packet traffic does not delay or hold up registration, billing and security services 310. A common registration method within the registration and billing component would be for receiving registration packets when a WMCD 24 first starts, or when they change networks. Normally billing and registration information is very critical so the coordinating router 20 has the flexibility in design to provided dedicated NIAs 308 for this purpose.

Figure 8:
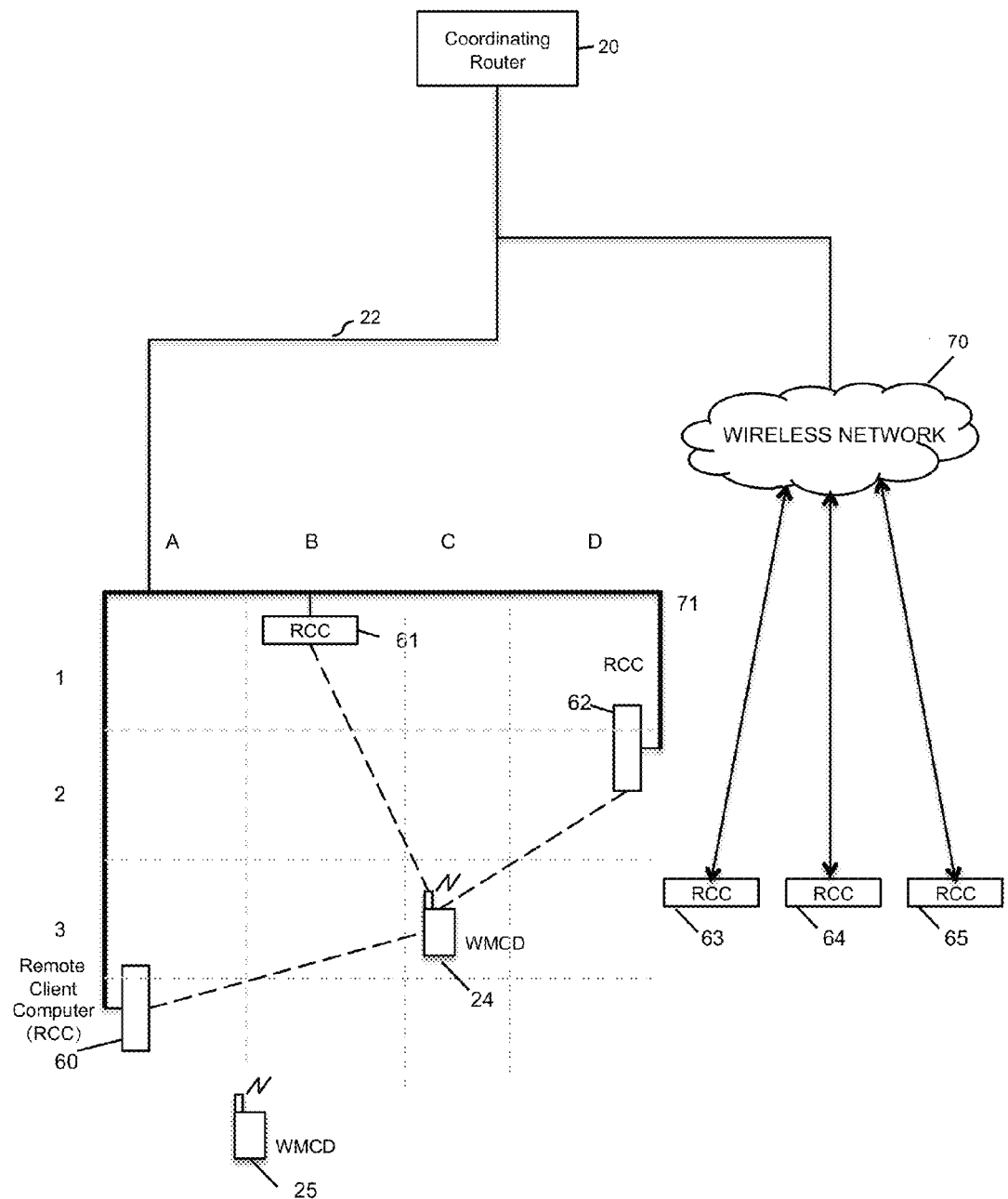
FIG. 8 is a detailed diagram of one embodiment at time 12:00:00 identifying the geolocation of a WMCD 24.

In reference to FIG. 8, this diagram presents one embodiment of the present invention at an illustrative time of 12:00:00 where through wireless signals the geolocation of WMCD 24 is detected, and the geolocator 400 identifies the geolocation of WMCD 24 as C3. The geolocator 400 searches the database of geolocation of the remote client computers in the network, and identifies that remote client computer 62 as the closest remote client computer to the WMCD 24. The WWTH 306 and NIA 308 are directed to link the data communication from the host system to the remote client computer 62.

Figure 9:
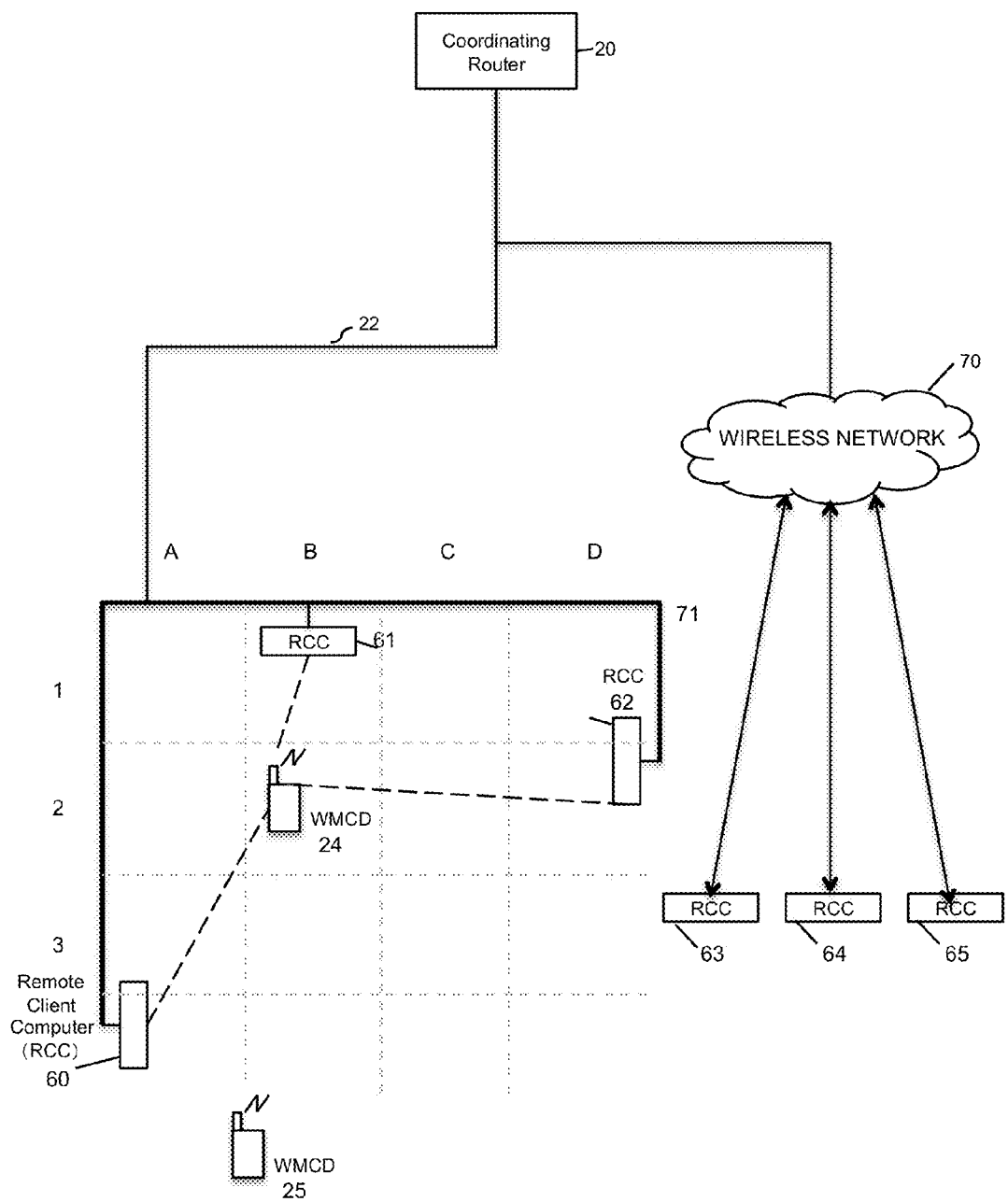
FIG. 9 is a detailed diagram of one embodiment at time 12:01:00 identifying the geolocation of a WMCD 24.

In reference to FIG. 9, this diagram presents one embodiment of the current invention at an illustrative time of 12:00:30 where through wireless signals the geolocation of WMCD 24 is detected, and the geolocator 400 identifies the geolocation of WMCD 24 as B2. The geolocator 400 searches the database of geolocation of the remote client computers in the network, and identifies that remote client computer 61 as the closest remote client computer to the WMCD 24. The WWTH 306 and NIA 308 are then directed to link the data communication from the host system to the remote client computer 61.

In reference to FIG. 10, this diagram presents preferable protocol layers used within the host service 28, within the coordinating router 20 and within the coupled WMCD 24. One reason the coordinating router 20 can offer the services and features it does is because of the protocol layers used to exchange data. Other protocols or protocol layers could be substituted for Internet standard protocols.

Turning now to FIG. 10 the first protocol layer in the host service 28 is the original data 400. The original data 400 acts as the payload of the message, i.e. the data that is communicated to the one of the plurality of remote client computers 61 that is coupled to and nearest to the user's WMCD 24. The original data of the message 400 might be extracted from some database for the purposes of being pushed to the one of the plurality of remote client computers 61 that is coupled to and nearest to the user's WMCD, it could be a response to a request from the one of the plurality of remote client computers that is coupled to and nearest to the user's WMCD, or could be real-time response to a one of the plurality of remote client computers that is coupled to and nearest to the user's WMCD query. In some cases, only a portion of the original data acts as the payload. The original data could have a wide-range of data processing and transformations performed on it. For example, the data could be tokenized, transcoded, compressed, encrypted, signed, authenticated, encoded, enveloped, or may other data transforming steps. These transformations are common in wireless data transmissions to optimized bandwidth, reduce cost, provide end-to-end security or to provide authentication services. When the host service is within a corporate enterprise computer system environment, security is mandatory, so that all sensitive or confidential corporate data is not compromised. This processing preferably takes place before the data exits the firewall of the corporate enterprise computer system. The message could also be tokenized, translated or some other transformation could be applied to it. For one skilled in the art of protocols, it is clear that the payload could be 'prepared' for shipment in many ways depending on the requirements of the sender and receiver. Once the correct enveloping is performed, the original data is then given to the protocol for the coordinating router 405 layer to prepare it for the next step.

The protocol for the coordinating router 405 is primarily a routing protocol for the coordinating router 20. A goal of the protocol for the coordinating router 405 is to carry a 'destination' field that indicates the destination of the message. Another use of the protocol for the coordinating router 405 is to provide a control field for demultiplexing information ("control information") at the host system. FIG. 1 shows a Host Service Agent 12 that is demultiplexing one data communication connection to the coordinating router 20 across three host services 42-46. This control information can be carried in the protocol for the coordinating router 405 and would be preferably transparent to the coordinating router 20. Transparent in the sense that the coordinating router need not act on the control information. The presence of the protocol for the coordinating router 405 provides a method to abstract the wireless network 70 from the host service 28, and it can facilitate a method for abstracting the address of the one of the plurality of remote client computers 61 that is coupled to and nearest to the user's WMCD 24 from the host service 28. For example if the one of the plurality of remote client computers 61 that is coupled to and nearest to the user's WMCD 24 address, as used by the wireless network, is a dynamically assigned, private IP address, (created in some cases by the wireless network), then multiple WMCD addressing translation can be performed within the coordinating router 20. The protocol for the coordinating router 405 adds routing information for the coordinating router in either direction (i.e., data traffic from the remote client computer and the WMCD to the host service or data traffic from the host service to the one of the plurality of remote client computers 61 that is coupled to and nearest to the user's WMCD 24 and the WMCD 24), depending on the destination. When the host service 28 is sending a message to the one of the plurality of remote client computers 61 that is coupled to and nearest to the user's WMCD 24, the message includes at least the original data 400, the protocol for the coordinating router 405 and an identifier that corresponds to the one of the plurality of remote client computers 61 that is coupled to and nearest to the user's WMCD 24. This identifier could be a real device identifier like a MAN (Mobitex Access Number) identifier or LLI (Logical Link Identifier) identifier, as used in the Mobitex and Datatac networks respectively. Other examples include a serial number for the one of the plurality of remote client computers 61 that is coupled to and nearest to the user's WMCD 24, an email address or codename of the user of the one of the plurality of remote client computers 61 that is coupled to and nearest to the user's WMCD 24. The identifier could also be an IP address, MSISDN or IMSI in the case of GPRS. In some situations, i.e. when using dynamic, private IP addresses in GPRS, the device identifier could be a PIN-like number assigned at manufacturing time. In this latter case, the coordinating router 20 preferably has the ability to dynamically map 'Device PIN' to 'Real Device ID' within the coordinating router database 340 as data items arrive at the coordinating router. In the other direction, when the message comes from the one of the plurality of remote client computers 61 that is coupled to and nearest to the user's WMCD 24 to the host service 28 the destination field is the Host Service Id. The Host Service Id allows the coordinating router 20 to locate the correct host for the data message. The one of the plurality of remote client computers 61 that is coupled to and nearest to the user's WMCD 24 is given the Host Service Id preferably when it first registers for the host service, either over the wireless network ("over the air") or through a separate channel, i.e. a telephone call and it can be manually entered by the user. For one skilled in the art there could be some further additions made to this protocol, or other ways to encode the information, but the intent is the same. For example, it might be possible to place some limited control information into the protocol for the coordinating router to inform the receiver that the original data 400 is encrypted or compressed. There could be a control code so that a representation of the command could be exchanged between the two end points, meaning that there would be no original data 400 in the data item. Another piece of information that could be added, may be a host service name. The service name could be used by a Host Service Agent 28b to demultiplex and send data to multiple host services above it 28c and 28d. In this situation the host service name is used as a control code between one or more remote client computer, the coupled WMCD, and the Host Service Agent 28b. One advantage of doing this is that only one host-router communication connection from the Host System is required, instead of two. This reduces the number of holes in the firewall 10, which would reduce security risks and be more acceptable to the IT department managing the corporate enterprise computer system for the host system.

Once this protocol for the coordinating router 405 is added it may be transported across a communications connection/ link to the coordinating router 20. As already discussed there are many protocol choices for carrying the original data 400 and the protocol for the coordinating router 405 to the coordinating router 20 from the host system or service. The TCP/IP and HTTP/XML choice are preferred. The main goal of this protocol is to provide a tunnel across the communications connection/link between the host system 28 and the coordinating router 20. The tunnel carries all data in both directions and any other control information required between the two ends. The point-to-point delivery protocol 410 preferably provides one or more of the following properties: (a) It should be continuously connected so that data can flow quickly and easily with little overhead. Since large quantities of data are being exchanged asynchronously with a community of remote client computers it is important to stay on-line constantly and add little overhead. (b) It should allow for control messages to be exchanged with the coordinating router 20. During transmission and reception of data it is important to have the ability to acknowledge packets have been delivered. Since one pipe is carrying the payload for a community of the plurality of Remote Client, there is a lot of control data being exchanged. (c) It should be able to offer flow control and guaranteed end-to-end acknowledgments. Since the wireless networks are generally slower than land-line networks it is important the coordinating router 20 can flow-control and throttle the host service 28. When the host service 28 is pushing information to the remote client computers 61 that is coupled to and nearest to the user's WMCD 24, this has the potential to overwhelm the storage and delivery capacity of the present invention 20. If messages aren't getting through to one of the plurality of remote client computers 61 that is coupled to and nearest to the user's WMCD 24, the host service 28 should naturally be told to hold back delivering more data until the first data items are delivered. This is already possible by using the message acknowledgements on a per remote client computer basis, but a situation can occur where a given host service 28 is overwhelming the coordinating router 20 with data across thousands of remote client computers.

Figure 5:
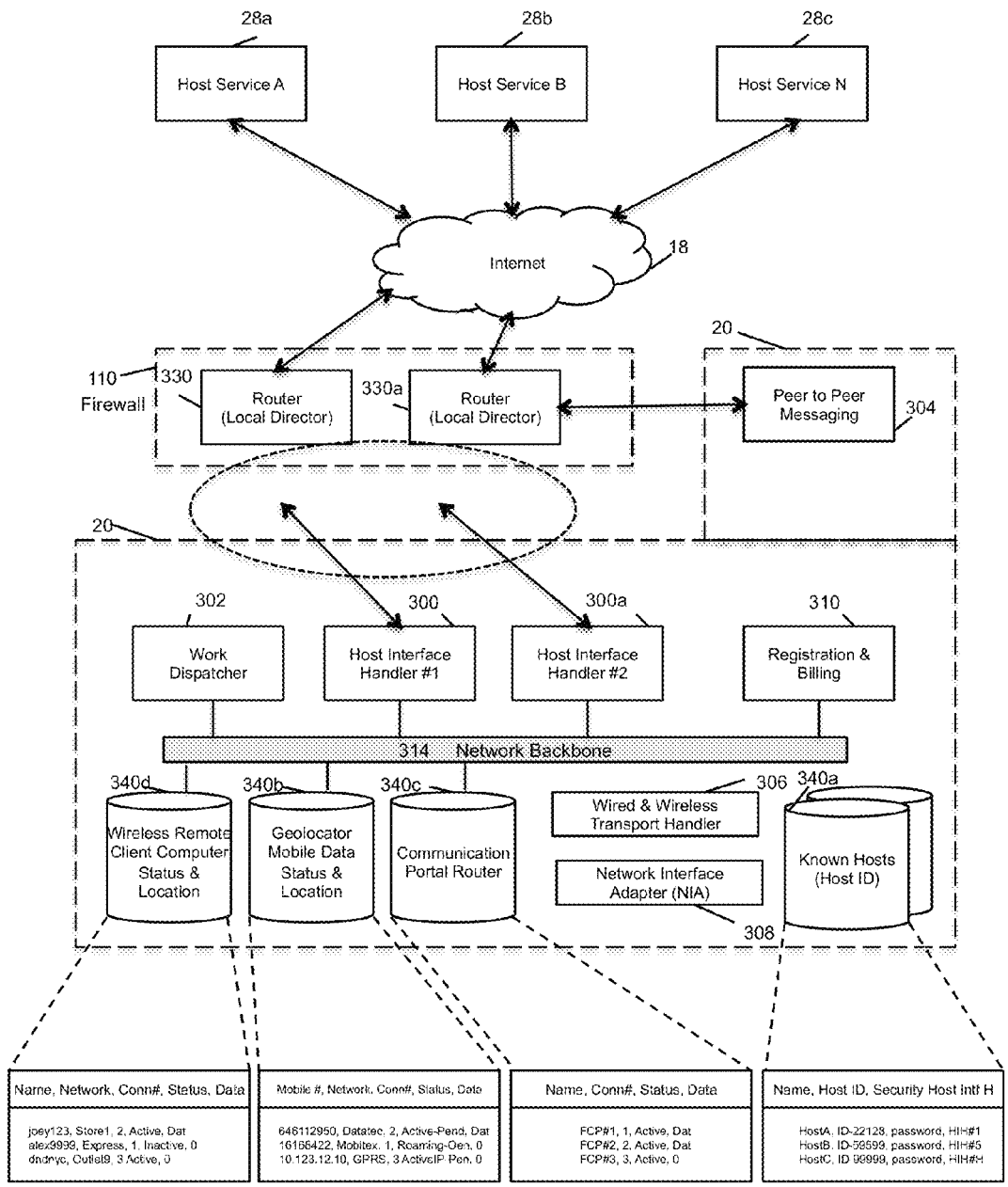
FIG. 5 is a detailed diagram expanding on the host interface handler within the present invention. This component is responsible for support of all data exchanges with host systems wishing to communicate with one of the plurality of remote client computers that is coupled to and nearest to a user's WMCD.
Figure 6:
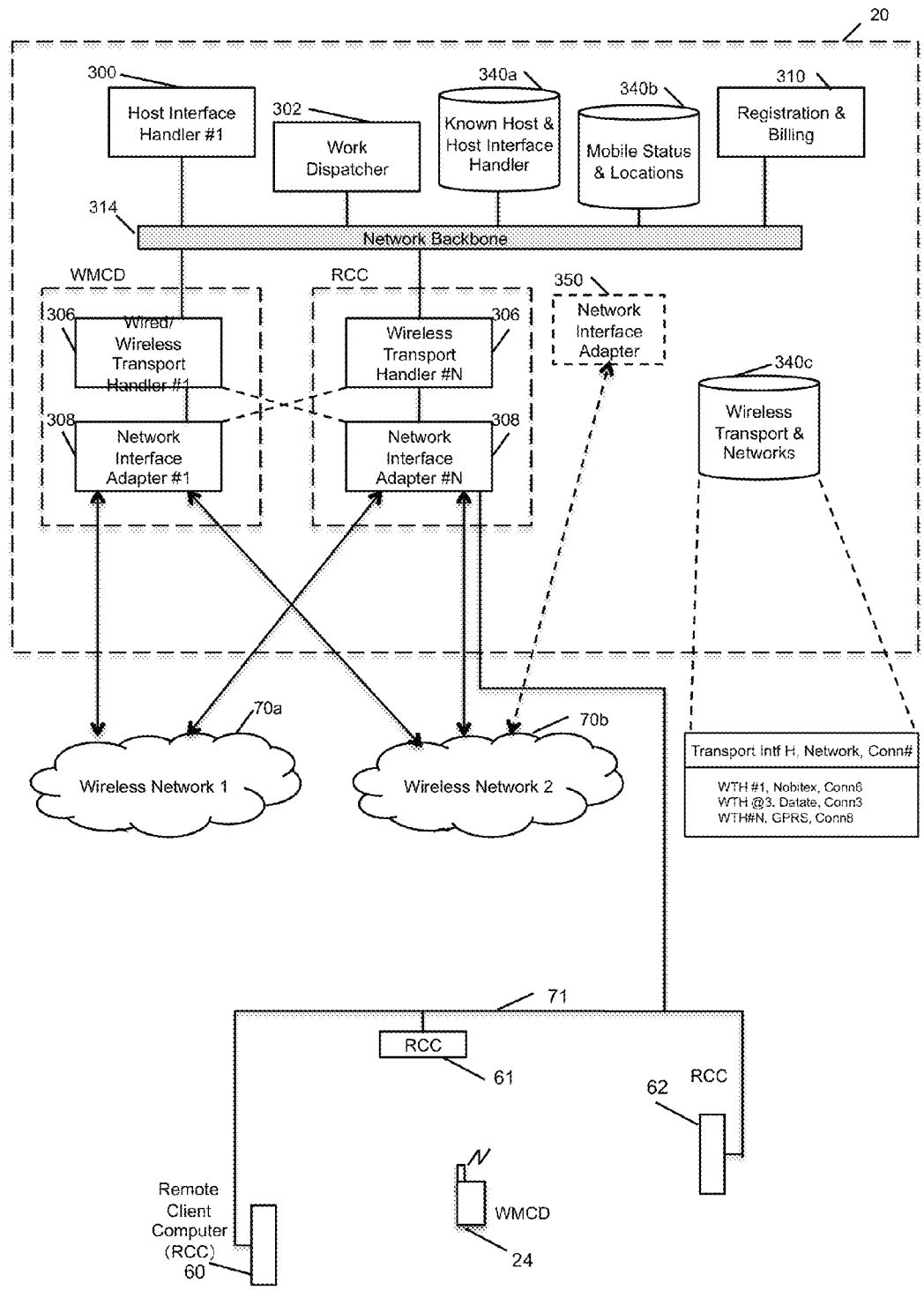
FIG. 6 is a detailed diagram of the wireless transport and network interface adapter components within the coordinating router. These components ensure the delivery of data, perform packetization functions and track the location of the WMCD.
Figure 7:
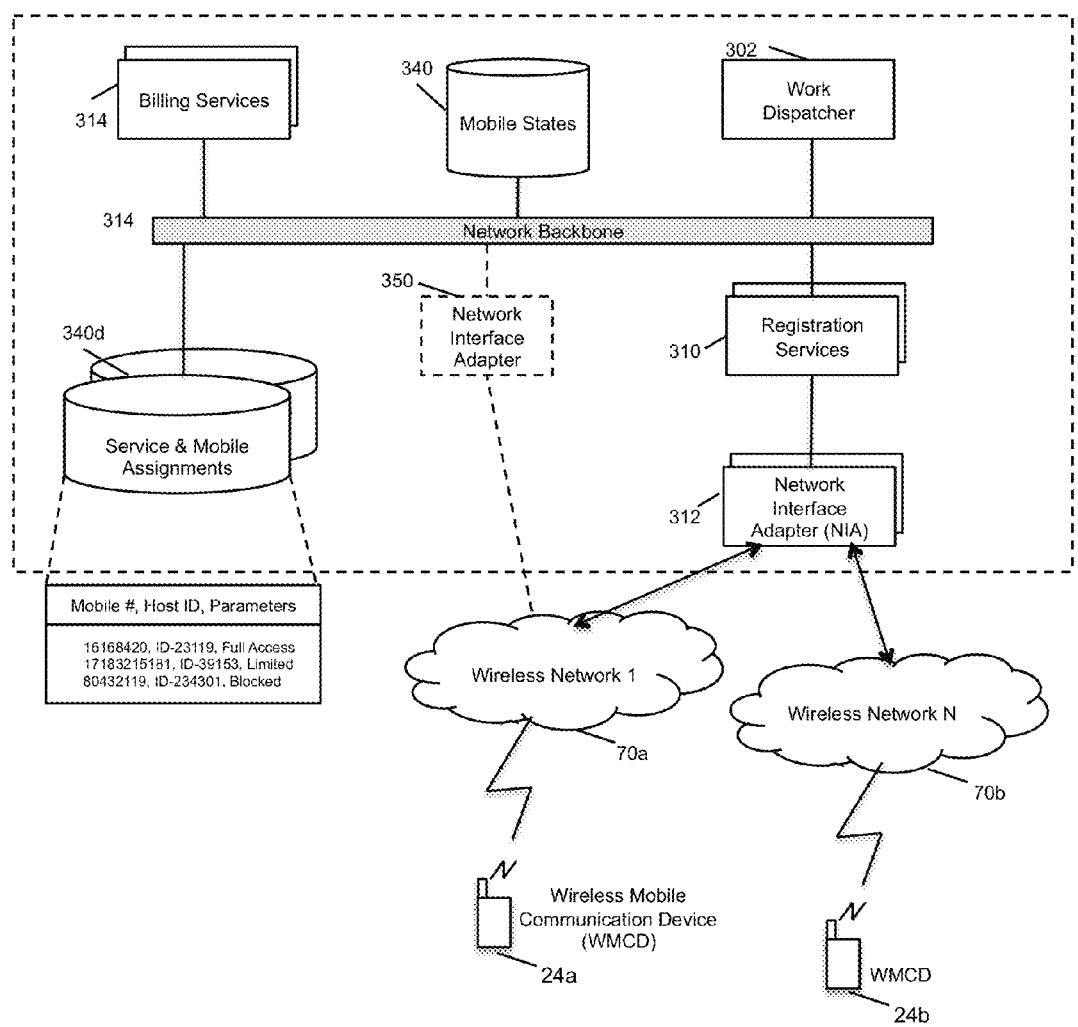
FIG. 7 is a detailed diagram of the registration and billing components within the present invention. These components allow the WMCD to update their location and provide billing records as the WMCD performs different operations.

Once the point-to-point delivery 410 of the original data 400 and the protocol for the coordinating router 405 is complete, the coordinating router 20 can route the message based on the protocol for the coordinating router 405. It performs this routing by looking in the destination field of the protocol for the coordinating router 405. The destination field will either have a remote client computer 61 and a WMCD 24 identifier, or a Host Service Id. FIGS. 5-7 describe in greater detail how this routing function takes place. If the message is going towards the remote client computer 61, the coordinating router 20 adds a transport layer 415 for guaranteed delivery and performs any necessary 'always on' activities 415 to assure it can reach the one of the plurality of remote client computers 61 that is coupled to and nearest to the user's WMCD 24. For example in GPRS the always on activities might involve sending an SMS message to the one of the plurality of remote client computers 61 that is coupled to and nearest to the user's WMCD 24 requesting that it activate a PDP Context and get an IP address assigned to it. The transport protocol may range in design and style. In the other direction the coordinating router 20 would strip off the present invention protocol 415. What is generally important in the transport layer 415 are one or more of the following properties: (a) It should be designed as a loosely-coupled transport of information to the one of the plurality of remote client computers 61 that is coupled to and nearest to the user's WMCD 24. This means that using a session-based, aggressive message delivery can be a problem. Given the number of marginal coverage and out-of-coverage anomalies that can take place in the wireless network 120, the transport should have some 'very lax' delivery requirements to ensure messages are received. b) It should offer a connectionless, datagram reassembly delivery method. Many connection-based transports have been tried, including modifications to the Transport Control Protocol (TCP) used on the Internet with limited success. What works best is normally a fragmentation and reassemble method that simply ensures the fragments arrived in a specific order so they can be reassembled. Delivery patterns for each packet in a message can range from seconds to days, depending on the state of the WMCD c) It should be able to accept network control messages and feedback if available. Some wireless networks will inform the coordinating router 20 what is happening to the one of the plurality of remote client computers 61 that is coupled to and nearest to the user's WMCD 24. These feedback messages are essential to improving the delivery experience.

When sending to the remote client computer 61 that is coupled to the WMCD 24, the present invention transport protocol 415 then adds the necessary network protocols 420. Some networks have proprietary network protocols, like Mobitex and Datatac, others networks like GPRS offer native TCP/IP or UDP/IP connection alternatives. Generally speaking the UDP/IP protocol is the preferred protocol for a network like GPRS, as it provides the loose coupling needed to deliver a series of packets to construct the message. The wireless network 70 then uses the network protocol 420 to route the packet to the correct one of the plurality of remote client computers 61 that is coupled to and nearest to the user's WMCD 24. Once received by the one of the plurality of remote client computers 61 that is coupled to and nearest to the user's WMCD 24 it proceeds to remove the network protocol 420, the present invention protocol 415 and the protocol for the present invention 405, to get at the payload 400. If necessary, one of the plurality of remote client computers 61 that is coupled to and nearest to the user's WMCD 24 will respond over the wireless transport 415 to acknowledge reception of the packet. If requested in a network like GPRS, the one of the plurality of remote client computers 61 that is coupled to and nearest to the user's WMCD 24 will also open a PDP Context and acquire an IP address so that data can be sent to the one of the plurality of remote client computers 61 that is coupled to and nearest to the user's WMCD 24 from the coordinating router 20. In the end, the correct use of these protocols makes the coordinating router 20 a perfect abstraction and wireless tool for connecting host services 28, 100, 102 to a community of plurality of remote client computers and WMCD.

In the other direction when the present invention 20 receives a packet from one of the plurality of remote client computers that is coupled to and nearest to the user's WMCD 24 it preferably first strips off the network protocol 420 and retains the remote client computer 24 identifier. If not already present the coordinating router 20 places the remote client computer 24 identifier into the source field of the protocol for the present invention 405. Next it removes the transport protocol 415 and performs any necessary acknowledgments needed. It then reads the Host Service Id from the destination field of the protocol for the coordinating router 405. It packages at least the original data 400 and the protocol for the present invention 405 into the point-to-point delivery protocol 410, and then the packaged data is delivered to the host service 28. The host service 28 removes the point-to-point protocol, and sends back an acknowledgement if necessary. The protocol for the present invention 405 is examined for control sequences, host names and the one of the plurality of remote client computers that is coupled to and nearest to the user's WMCD 24 identifier. The original data 400 is then passed to the correct host service 28*a*, 28*b*, 28*c* or 28*d* using the Host Service Id and the host service name if present.

Figure 11:
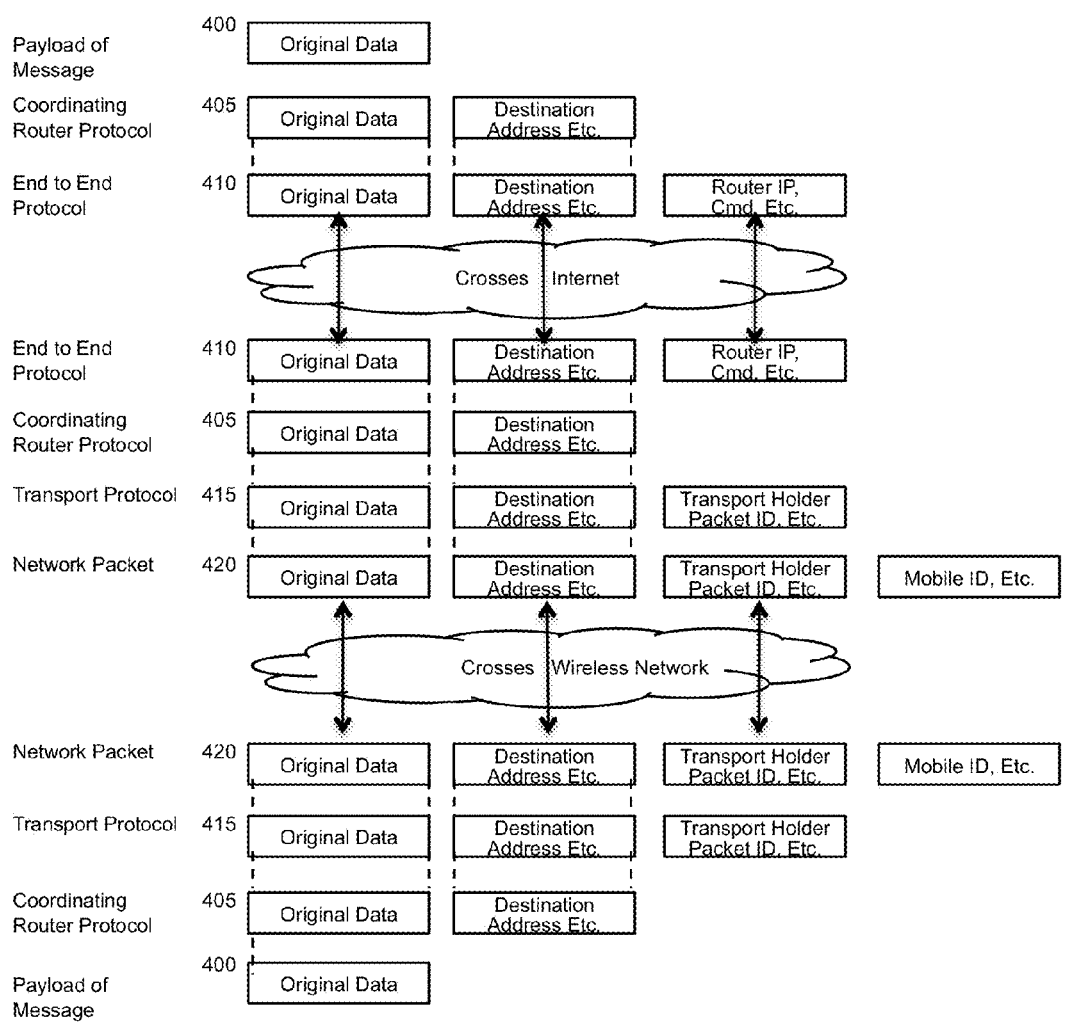
FIG. 11 is a protocol layer diagram showing how each protocol layer fits into the corresponding protocol layer.

Turning now to FIG. 11 this illustration presents another variation of the protocol layers that are used with the coordinating router 20. This traditional view shows how each protocol layer fits into the adjacent layers. Starting from the host service (top of the diagram) the original data 400 is the reason for the message to be transmitted. A message is then constructed from the original data and a present invention protocol 405. The coordinating router protocol 405 contains at least a destination address (one of the plurality of remote client computers 61 that is nearest to the user's WMCD Device 24 identifier) when it is leaving the host service 28. Another message is then constructed that contains the original data 400, the present invention protocol 405 and an end-to-end protocol 410. The end-to-end protocol 410 contains at least a coordinating router 20 address (an IP address when using TCP/IP for the data connection method) a command sequence and a message length. The command sequence would be commands like 'data', 'acknowledgement', 'flow on' or 'flow off'. This message is then sent over the land-line network connecting the host system 28 to the present invention 20, shown in FIG. 11 as the Internet.

The coordinating router 20 then will remove the end-to-end protocol 410 and is left with the present invention protocol 405 and the original data 400. A new message is constructed that contains the original data 400, the present invention protocol 405 and the transport protocol 415. The transport protocol 415 contains at least a transport header command, a packet Id, a packet sequence and a total message length. The transport command would be at least commands like: 'data', 'acknowledgement', error and 'resend'. Another new message is then constructed from the original data 400, the coordinating router protocol 405, the transport protocol 415 and the network packet 420. The network packet 420 contains at least the destination mobile identifier, and other components required by the network. If the Internet Protocol (IP) is being used then the destination mobile identifier would be the currently assigned IP address for the one of the plurality of remote client computers 61 that is coupled to and nearest to the user's WMCD 24. This message then travels across the wired/wireless network 70 to one of the plurality of remote client computers 61 that is coupled to and nearest to the user's WMCD 24.

When one of the plurality of remote client computers 61 that is coupled to and nearest to the user's WMCD 24 receives this message it removes the network packet 420 and is left with the original data 400, the coordinating router Protocol 405 and the Transport Protocol 415. Next the one of the plurality of remote client computers 61 that is coupled to and nearest to the user's WMCD 24 then removes the Transport Protocol 415 and performs any acknowledgement required by the Transport Protocol 415. Finally the one of the plurality of remote client computers 61 that is coupled to and nearest to the user's WMCD 24 removes the coordinating router Protocol 405 and is left with the original data 400. In the opposite direction the said steps occur except that the destination address in the coordinating router Protocol 405 is the Host Service Id as defined earlier. The Host Service Id is exchanged with the one of the plurality of remote client computers 61 that is coupled to and nearest to the user's WMCD 24 so that it has a method of addressing the host service 28.

In reference to FIG. 5 this illustration focuses on the host interface handler (HIH) 300, and its operation within the coordinating router 20 to produce the features being claimed by this application. The HIH 300 is responsible for accepting connections and exchanging data between the host services 28 and the present invention 20. The HIH also validates the initial host connection to ensure that another computer is not impersonating the host service 28. The HIH 300 also is involved with routing traffic to the correct transport handler 306 for delivery to the correct one of the plurality of remote client computers 61 that is coupled to and nearest to the user's WMCD 24.

Turning now to FIG. 5 the first component shown is the firewall 110, now represented by one or more Cisco routers. For one skilled in the art it is clear that there could be many ways to implement a firewall 110, and a Cisco router offers good speed and cost performance. For the sake of this diagram the Cisco router is labeled a local director 330, as it directs incoming TCP/IP connections to the appropriate HIH 300, based on load balancing and traffic requirements. At this level the Cisco router confirms that the IP address comes from a known Host Service 28 and allows the connection through to the HIH 300. The next step is for the host service 28 and the HIH 300 to perform a security exchange of keys using standard Internet methods. One method that can be used is the SSL (secure socket layer) connection method. Another method would be to use an HMAC mechanism for message authentication using cryptographic hash functions. HMAC can be used with any iterative cryptographic hash function, e.g., MD5, SHA-1, in combination with a secret shared key. This method provides strong cryptographic and also provides good authentication as there is a shared secret key that is exchanged. The goal is to ensure that another host service 28 doesn't take over an incorrect host connection and receive their traffic. Whatever the method is used, the HIH 300 assigned to accept this host service 28, would authenticate, confirm and register the Host Service Id assigned to the connecting host service 28. In this system each host service 28 is assigned a Host Service Id, as a way to identify and route information to them. In other words the present invention runs a simple Dynamic Host Control Protocol (DHCP) where the host names can be input manually by the operator of the present invention 20, or they could be entered through a secure web site. The steps of authentication, confirmation and registration happen within the coordinating router 20 through the Known Host Database 340*a* that is also accessible from the network backbone 314. The known host database 340*a*, working in conjunction with the work dispatcher 302, will become aware of the host service 28 to HIH 300 assignment. This assignment is then placed in the Known Host database 340*a* so it can be used whenever necessary for message delivery and routing. If there are any problems with either end of the connection, the work dispatcher 302 can re-assign the connection to ensure continuous host service 28 support. Both the known host database 340*a* and the work dispatcher 302 are mirrored in operation to provide greater fault tolerance in the system. Once the connection is established a two-way, bi-directional pipe is established that allows for data exchange with any number of the plurality of remote client computers that is coupled to and nearest to the user's WMCD 24. As shown the known host database 340 will contain at least the host name, the Host Service Id, security information used when establishing a communication link, and the currently assigned HIH 300 if there is any. For one skilled in the art of data communications there might be advanced parameters in the known host database 340*a* for the state of the host service 28 connection, i.e. whether it is flow controlled or not. There could be other parameters indicating the number of outstanding messages from the host service 28, the length the connection has been established, and the owner or company of the host service 28.

After the data path is established the host service 28 can send data to one of the plurality of remote client computers 61 that is coupled to and nearest to the user's WMCD 24 as needed, without solicitation or being requested by the WMCD 24 user. For each message that arrives to the coordinating router 20, it is tagged, saved and given to a Transport Handler 306 for delivery. The work dispatcher 302 again turns to the database 340, this time looking at the one of the plurality of remote client computers 61 that is coupled to and nearest to the user's WMCD 24 identifier, the WMCD's status and WMCD's location and the related remote client computer's location to determine which Transport Handler 306 should be assigned the task of delivering the message. Different Transporter Handler 306 is assigned different networks types, so these factors are also taken into account when the WMCD's status and characteristics are checked. The one of the plurality of remote client computers 61 that is coupled to and nearest to the user's WMCD 24 identifier in the destination field of the protocol for the present invention 405 will indicate what network type is appropriate for this message. Once the assignment is made, the HIH 300 is informed so that it can cache the information for future data exchanges with this same one of the plurality of remote client computers 61 that is coupled to and nearest to the user's WMCD 24. By keeping a cache of these assignments, the number of database hits is kept to a minimum and the work dispatcher 302 does not become the bottleneck of the coordinating router 20. During this process the billing component will be given billing records including fields like: the host name and Host Service Id, the connection time of the host service 28, the number of messages and their sizes exchanged, the types of services being accessed, the times of all data exchanges and any other relevant data that could affect billing information.

As messages are delivered to the remote client computer 61 and the coupled WMCD 24 it is up to the Transporter Handler 306 to inform the HIH 300 of the completion. This allows the HIH 300 to send a final confirmation to the host service 28, if it is supported over the interface being used, and allows the original message to be removed from the mobile database 340b as having been delivered to the one of the plurality of remote client computers 61 that is coupled to and nearest to the user's WMCD 24.

As shown in FIG. 5 the mobile database 340b has many fields, and it has at least fields that identify the WMCD identifier, the network type of the device, the physical connection number, the current state, the data status and an array of data items that might be pending or unacknowledged. The physical connection number is used when more then one link is available to a specific wireless network 70. Some networks impose requirements for traffic flow into the network to load balance the system. The Mobitex network in the US has just such a restriction and has sub-divided its network into regions to improve delivery. The mobile database 340b will be discussed further in FIG. 6.

Another routing method offered by the coordinating router 20 is the ability for one of the plurality of remote client computers 61 that is coupled to and nearest to the user's WMCD 24 to send directly to another without involving an external host service 28. In certain circumstances, a user of a coordinating router 20 may wish to send a data item directly to another one of the plurality of remote client computers 61 that is coupled to and nearest to the user's WMCD 24 associated with the same coordinating router 20, without sending the data item to a host system 28. This is a common technique used in Instant Messaging systems and is very popular in desktop host systems. The peer-to-peer messaging component 304, in the coordinating router 20 in FIG. 5 enables such communication between one of the plurality of remote client computers 61 that is coupled to and nearest to the user's WMCD 24. If a data item is to be sent from the WMCD 25 to the one of the plurality of remote client computers 61 that is coupled to and nearest to the user's Wireless Mobile Communication Device 24, then an identifier for the WMCD is inserted as a destination address of the protocol for the coordinating router 405. The data item is then sent to the coordinating router 20, which recognizes the destination as a another of the plurality of remote client computers that is coupled to and nearest to another user's WMCD identifier. In the inverse, if a data item is to be sent from one of the plurality of remote client computers 61 that is coupled to and nearest to the user's Wireless Mobile Communication Device 24 to a Wireless Mobile Communications Device 25, then an identifier for the Wireless Mobile Communications Device is inserted as a destination address of the protocol for the coordinating router 405.

If a data item is to be sent from one of the plurality of remote client computers 61 that is coupled to and nearest to the user's WMCD 24a to another one of the plurality of remote client computers that is coupled to and nearest to the user's Wireless Mobile Communication Device 24b for example (not shown), then an identifier for one of the plurality of remote client computers that is coupled to and nearest to the user's Wireless Mobile Communication Device 24b is inserted as a destination address of the protocol for the coordinating router 405. The data item is then sent to the coordinating router 20, which recognizes the destination as a one of the plurality of remote client computers 61 that is coupled to and nearest to the user's WMCD 24 identifier, instead of a Host Service Id. In one embodiment of the invention, the data item is an E-Mail message that would use an SMTP address as the destination. If the data item address contains an '@' symbol, then the data item would be destined for a host service offering an E-mail service. Where a wireless network address or identifier, such as a MAN (Mobitex Access Number) or NET ID (a Datatac Host Id) for example, appears as the destination address however, the Peer-to-Peer Messaging component 304 recognizes the message as a peer-to-peer message.

Under control of the peer-to-peer messaging component 304, coordinating router 20 sends the data item back through the coordinating router 20 to one of the plurality of remote client computers 61 that is coupled to and nearest to the user's WMCD 24b, instead of through one of the host services 28. The data item is thus forwarded to the one of the plurality of remote client computers that is coupled to and nearest to the user's WMCD 24b without having been sent to a host service 28 associated with the one of the plurality of remote client computers 61 that is coupled to and nearest to the user's WMCD 24. Such functionality is particularly useful for example when the user of one of the plurality of remote client computers 61 that is coupled to and nearest to the user's WMCD 24a is aware that the user of another one of the plurality of remote client computers that is coupled to and nearest to the user's WMCD 24b is not at the location of the host system 28. When the coordinating router detects that the WMCD 24b is out of wireless network coverage, if there are any data requested that was intended to be sent to one of the plurality of remote client computers that is coupled to and nearest to the user's WMCD 24b the coordinating router 20 stores the data item to the mobile database 340b for delivery to one of the plurality of remote client computers that is coupled to and nearest to the user's WMCD 24*b* when it returns to a coverage area of the network 70.

In reference to FIG. 6 this figure focuses on the role of the transport handler (TH) 306 and the network interface adapter (NIA) 308 in the role of delivering and receiving data to a wireless network 70. As demonstrated in FIG. 5 the role of the work dispatcher 302 and the mobile database 340*b* are key to providing the routing operation required. In FIG. 6 another database is introduced the wireless transport and networks database 340*c*. This database holds the relationship between TH 306 and wireless networks 70. Since one coordinating router 20 supports any number of wireless networks 70, this is done by mapping wireless networks 70 onto different TH 306 components.

Turning now to FIG. 6 we can build on the description provided in FIG. 5. For data arriving from a host service 28 there is an assignment made to a TH 306. This assignment was briefly in FIG. 5, and was based on many factors. In the case of the TH 306, the work dispatcher 302 will have several THs 306 that can reach the same wireless network 70 and provide redundant service. Therefore, in addition to finding the correct TH 306, that can provide access to the correct network, the work dispatcher 302 ensure the TH 306 does it's job. If the TH 306 has a problem, is overloaded, or some other problem exists, it will re-assign the message to another TH 306 if the first one fails for some reason. To assist the work dispatcher 302 the wireless transport database 340*c* keeps track of all the TH 306, the wireless network 70 they support, their roles and their capabilities. Each TH 306 might talk to one or more NIA 308. The NIA 350 might be accessible direction or via the network backbone 314. This architectural decision is based on how closely coupled the NIA 308 will be with the WTH 306. A closely coupled system means the two components can be optimized and improved to improve performance and throughput. A loose coupling means that if an NIA 350 fails it is easier for the WTH 306 to acquire a new NIA 350 to serve the same purpose. In the loose coupling embodiment the TH 306 would request a NIA 350 that connects to a given network via the work dispatcher 302. The work dispatcher would go to the transport database 340*c* to find an assignment of NIA 350 to wireless network 70 mappings. The wireless transport and networks database 340*c* has a range of fields to provide the functionality necessary for the coordinating router 20. The transport database 340*c* has at least the following fields: TH number, the network that it is supporting and the connection number identified. Each WTH 306 can support many links to NIA 308 and thus to many wireless networks 70.

As part of the functionality offered by the coordinating router 20, the TH 306 is responsible for some very major elements. Specifically its goal is to ensure that messages are broken into network packet sizes and that each packet of a given message arrives to the destination. Although this sounds easy, and there have been many transports written before this is especially hard in a wireless network 70. This application is not claiming the implementation of a wireless transport layer, instead it is the synergy of a wireless transport layer along with all the other components of the coordinating router 20 that create a solution bigger then their individual parts.

Once the message has been broken into packets the TH 306 selects the correct NIA 308 to deliver the message. Each NIA 308 might have connections to many networks, and different NIAs 308 might have redundant links so that NIAs 308 are fault tolerant. The TH 306 saves the state information of each one of the plurality of remote client computers that is coupled to and nearest to the user's WMCD in the mobile database 340*b* and in a local cache known as the location database. This state information informs the TH 306 whether one of the plurality of remote client computers that is coupled to and nearest to the user's Wireless Mobile Communication Device has packets still pending, what the last delivery times were like and the last known NIA 308 (network link) the one of the plurality of remote client computers that is coupled to and nearest to the user's WMCD was reached over. All this information makes it possible for the TH 306 to provide the best possible ability to track and reach the one of the plurality of remote client computers that is coupled to and nearest to the user's WMCD. To complement this the coordinating router 20 also provides the ability to push information to one of the plurality of remote client computers that is coupled to and nearest to the user's WMCD without the user having to perform any action whatsoever. This ability is implemented either within the TH 306, or in conjunction with the NIA 308. For example in the GPRS network, which is a data overlay on the GSM network, the NIA 308 implements a SMS-ping method to ensure the one of the plurality of remote client computers 61 that is coupled to and nearest to the user's WMCD 24 always has a PDP context activated and thus is assigned an IP address. The NIA 308 also is capable of monitoring DHCP traffic to know when IP addresses are assigned or unassigned to one of the plurality of remote client computers that is coupled to and nearest to the user's Wireless Mobile Communication Device 24, also enhancing the ability of the coordinating router 20 to track the one of the plurality of remote client computers 61 that is coupled to and nearest to the user's WMCD 24. These entire enhancements provide an excellent message delivery experience for the WMCD user 24, and it requires all the components working together to provide the end-user experience required to make the coordinating router 20 an essential component of the wireless delivery and acknowledgement experience.

In reference to FIG. 7 this illustration focuses on the billing and registration aspects of the coordinating router 20. These components provide support functions within the coordinating router 20 to further strengthen its abilities and features. As already discussed, the registration and billing services 310 is a discrete task that accepts bill records from one or more other coordinating router components and preferably builds and maintains a billing database 340*e* (not shown). The billing records might come as UDP broadcasts, or through some special TCP channel to the billing component. Using a TIBCO information bus, the publish/subscribe model can be used very effectively for building billing records. The registration component 310 provides the ability to register new host services 28 and to register the movement of WMCD 24 from one network to another network 70.

Turning now to FIG. 7 there are several support services being presented for the coordinating router 20 to make use of. The first of these are billing services 314, which are preferable to the tracking of data and traffic between all wireless networks and the host service 28. In this example the billing services 314 has been broken out into its own service entity. One advantage of placing the billing services 314 in the coordinating router 20 is that all billing requirements across all wireless networks 26*a*, 26*b*, 26*c* and 26*d* may be aggregated into a single bill for the user or corporation. The billing component will allow for other components to deliver or send billing records to the billing component. Information for host-originated and mobile-originated billing messages will be defined. These billing messages preferably contain information like: name of the host service 28, the connection time of the host service 28, the number of messages exchanged and their respective sizes, the types of services being accessed, the times of all data exchanges and any other relevant data that could affect billing information. As a database of billing information is built up and refined it should be possible to bill customers using specialized billing techniques. Within the coordinating router 20 similar billing scenarios can also be created for with the correct information saved a very sophisticated billing scenario can be created where the operator of the coordinating router 20 charges based on issues like: 'Host Service A, when access after peak hours can be used for data exchanges of up to 10,000 bytes without charge'. For one skilled in the art, it is clear that there are hundreds of different charging profiles that could be created to the installed base with the correct billing records.

The next support element is for registration services 310. Registration services 310 are essential for registering various host services 28 and for allowing one of the plurality of remote client computers 61 that is coupled to and nearest to the user's WMCD 24 to inform the coordinating router 20 as to their current location. Another advanced use of the registration service 310 is the ability to inform a newly registered WMCD 24 as to which services are available and which they already have access to. This is valuable when a WMCD travels to another location and only certain host services 28 are available from that other location's wireless network. For instance, perhaps the host service 28*a* did not pay the extra costs of offering the service in that region, or perhaps there isn't a physical link to that wireless network. Whatever the case, the one of the plurality of remote client computers 61 that is coupled to and nearest to the user's WMCD 24 has the ability to send a registration request and get a registration response from the coordinating router 20. This exchange is possible because the registration service component 310 has the ability to check the mobile service and assignments database 340 to see what services have been defined for this one of the plurality of remote client computers 61 that is coupled to and nearest to the user's WMCD 24. Since the registration service 310 has a major conversation role with the one of the plurality of remote client computers 61 that is coupled to and nearest to the user's WMCD 24, one embodiment provides a NIA 312 directly for each registration server 310. Alternatively, the registration service 310 could also request the least busy NIA 312 from the work dispatcher 302 and use a round robin method to send and receive messages to one of the plurality of remote client computers 61 that is coupled to and nearest to the user's WMCD 24. The goal of providing the registration server 310 with their own dedicated NIA 312 is to ensure normal device traffic does not slow down or congest the ability for registration requests to be received in a timely manner.

These commands preferably permit the owner to control which host services are accessible by mobile users. In one embodiment, a secure web page requiring one or more passwords by the owner is provided and is coupled to the host interface handler 300 to permit the selection and transmission of such commands.

Having described in detail several preferred embodiments of the present invention, including preferred methods of operation, it is to be understood that this operation could be carried out with different elements and steps. It will be appreciated that the above description relates to preferred embodiments by way of example only. Many other variations of the invention will be obvious to those knowledgeable in the field, and such obvious variations are within the scope of the invention as described and claimed, whether or not expressly described.

For example, routing system functions may be distributed differently than described above according to the second embodiment. Further routing functions may possibly be distributed to additional distinct functional components, to improve scalability and reliability of the invention, or separate routing functions might instead be combined and provided by common functional components. For example, where the routing system is implemented primarily in software, the wireless transport functions could be further distributed among multiple computers. Similarly, functions performed by the protocol handlers and dispatchers may possibly be combined and executed on a single computer. A system designer can determine the degree of distributed processing and the routing system can be implemented accordingly.

Although the communication links between the wireless transports and packet blasters or wireless networks can be very long-range links, it might also be preferable to provide separate routing systems for geographically distant wireless networks. For example a routing system serving the Mobitex and DataTAC wireless networks in North America could be linked with a further routing system, which serves a GPRS network in Europe. This would preferably be accomplished by configuring at least one protocol handler in each routing system as a bridge component, through which the routing systems can send data items and possibly configuration information, wireless network address and subscriber information and the like.

In one embodiment, there is provided a method to route data items between a plurality of remote client computers and WMCD and a plurality of host services, the method comprising of the following steps: (a) generating a WMCD data item, at a remote client computer, and at a WMCD, comprising of: a host service identifier; and, a data payload; (b) preparing a wire and wireless network message containing the mobile data item by: adding to the mobile data item a network protocol conforming to protocols required by a network associated with the remote client computer and the WMCD; and, addressing the mobile data item with an address associated with the coordinating router; (c) transmitting the network message via the wired and wireless network to the coordinating router; (d) upon reception of the network message at the coordinating router: removing the network protocol from the network message thereby recovering the mobile data item; extracting at least a mobile identifier from the network message; adding the mobile identifier to the mobile data item; routing the mobile data item to a host service corresponding to the host service identifier in the mobile data item.

In another embodiment, there is provided a method to route data between a plurality of remote client computers, and WMCD and a plurality of message servers comprising of the following steps: (a) generating a mobile data at a WMCD comprising of: a destination identifier; and, an encrypted data payload comprising a body of an email message and addressing information for the body; (b) generating a network message comprising: the mobile data, a network protocol layer conforming to protocols required by a network, and a coordinating router address; (c) transmitting the network message via the network to the coordinating router; (d) upon reception of the wireless network message at the coordinating router: removing the network protocol layer from the network message thereby extracting the mobile data; adding a mobile identifier to the mobile data, if the mobile identifier is not already contained in the mobile data; routing, via the Internet, the mobile data to a message server, identified by the destination identifier, operating at a particular corporate enterprise computer system.

In another embodiment, there is provided a coordinating router method for routing data between a plurality of corporations and a plurality of remote client computers and WMCD, the method comprising: (a) upon reception of a network message at the coordinating router originating from a first one of the plurality of remote client computers that is coupled to and nearest to the user's WMCD via a wireless network coupled to the coordinating router, the steps comprising: recovering a first mobile data item generated at the remote client computer linked to the WMCD by removing a first wireless protocol network layer from the network message, said first remote client computer linked to WMCD data item comprising of an encrypted data payload and a corporation identifier; if the first WMCD data item lacks a WMCD identifier, then adding a WMCD identifier to the first WMCD data item; routing the first mobile data item to a first corporation from the plurality of corporations using a host service identifier in the first WMCD data item; (b) upon reception of a corporate data item at the coordinating router originating from a second corporation, the steps comprising: adding a network protocol layer to the corporate data item; routing the corporate data item to a second WMCD, via the wireless network, using a WMCD identifier in the corporate data item.

In another embodiment, there is provided a method to route data items between a plurality of remote client computers, WMCD and a plurality of host systems, the method comprising of the following steps: establishing a point-to-point communication connection between a first host system and a coordinating router; generating a first mobile network message at a first mobile device comprising: a first data item having at least a data payload; a first host service identifier associated with said data payload, a first coordinating router address, and a first set of network protocols, and; transmitting said first mobile network message from the first remote client computer coupled to and nearest to a WMCD to a first wireless network in communication therewith; routing said first mobile network message from the first wireless network to the coordinating router based on the coordinating router's address; receiving said first mobile network message at said first coordinating router; routing said first data item from the coordinating router to a first host service based on the first host service identifier.

In another embodiment, there is provided a method to route data items between a plurality of remote client computers, WMCD and a plurality of host systems, the method comprising of the following steps: establishing a plurality of point-to-point communication connections, wherein each host system of the plurality of host systems has an established point-to-point communication connection between the host system and a common coordinating router; sending data items from each of the host systems to the common coordinating router through each host system's corresponding point-to-point communication connection, wherein each of the data items includes a data payload, and a first WMCD identifier associated with said data payload; receiving the sent data items at the common coordinating router; performing the following steps for each received data item: association network of a plurality of wireless networks in communication with the common coordinating router and a second WMCD identifier; generating a mobile network message comprising the data item and a wireless network protocol layer including the second WMCD identifier; routing each generated mobile network message to a WMCD corresponding to the second one of the plurality of remote client computers that is coupled to and nearest to the user's WMCD identifier through the particular wireless network associated with the WMCD. The coordinating router can also provide the following services: 1) Tracking the location of and related time of a particular WMCD; 2) the use of Videophone at one of the plurality of remote client computers coupled to the coordinating router that is coupled to and nearest to the User A's WMCD for communication between User A and either a) the User B of another of the plurality of remote client computers with or without a coupling to a WMCD, b) the User C who is connected to the Internet via the coordinating router, or c) the User D who is connected to the another telecommunication service via the coordinating router; 3) Notification of emergency evacuation and alert, and 4) security surveillance.

I claim:

1. A method of routing data between a plurality of host services and a plurality of remote client computer via a wireless router system based on location of a communication device of one or more communication devices, comprising:

Storing, by the wireless router system, a plurality of host service identifier in a database at the wireless router system, each of the plurality of host service identifiers is associated with a corresponding host service of the plurality of host services;

Storing, by the wireless router system, a plurality of geographic location identifiers of the plurality of remote client computer in the database; each of the plurality of geographic location identifiers indicates the location of a corresponding remote client computer of the plurality of remote client computer;

Determining, by the communication device, a geographic location identifier of a particular remote client computer when the communication device is within a signal coverage area of the particular remote client computer;

Transmitting, by the communication device or the particular remote client computer, a data request message to the wireless router system, the data request message comprising the determined geographic location identifier of the particular remote client computer and a request for data;

Determining, by the wireless router system, a particular host service identifier of a particular host service able to service the data request message;

Establishing and connecting, using the particular host service identifier, the particular host service to the wireless router system with an authorized communication channel;

Communicating, from the particular host service, requested data to the wireless router system via the authorized communication channel for the communication device and the particular remote client computer;

Comparing, by the wireless router system, the determined geographic location identifier with a corresponding geographic location identifier in the database for the particular remote client computer verifying the location of the particular remote client computer; and Routing, from the wireless router system, the requested data to the particular remote client computer using the determined geographic location identifier of the particular remote client computer.

2. The method of claim 1, wherein the communication device is a wireless mobile communication device, or a wireless or wired fixed communication device.

3. The method of claim 1, further comprising:

Determining, by the wireless remote client computer, another geographic location identifier of an another particular remote client computer when the communication device is relocated from the signal coverage area of the particular remote client computer to a second signal coverage area of the another particular remote client computer;

Transmitting, by the communication device, an updated data request message to the wireless router system, the updated data request message comprising at least the another geographic location identifier of the another particular remote client computer;

Stopping routing, by the wireless router system, the requested data to the particular remote client computer; and Routing, from the wireless router system, the requested data to the another particular remote client computer using the another geographic location identifier of the another particular remote client computer.

4. The method of claim 1, further comprising:

Transmitting, from the particular remote client computer, a response data and the particular host service identifier to the wireless router system;

Routing the response data, by the wireless router system, using the particular host service identifier to the particular host service.

5. The method of claim 4, further comprising the wireless router system caching the response data from the particular remote client computer for the particular host service if the particular host service has not made a connection with the wireless router system.

6. The method of claim 1, further comprising providing a plurality of host systems, each host system being associated with at least one host service of the plurality of host services.

7. The method of claim 6, further comprising associating at least one of the host systems with more than one host service, each of the host systems including a host service agent for communicating with the plurality of host services.

8. The method of claim 7, wherein the database includes a host name, a corresponding host service identifier, a security credential, and a host interface handler identifier for each authorized host service.

9. The method of claim 8, wherein the security credential is used to create the secure, authenticated connection.

10. The method of claim 8, wherein the host interface handler identifier indicates which host interface handler a host service is communicating with.

11. The method of claim 8, wherein the database includes information that indicates whether the particular host service is flow controlled by the wireless router system.

12. The method of claim 8, wherein the database includes information that indicates an amount of pending data received from the host service but not yet routed through the wireless router system.

13. The method of claim 8, wherein the database includes information that indicates a length of time that the secure, authenticated connection has been established.

14. The method of claim 1, further comprising interfacing the wireless router system with a host service using one or more host interface handlers for receiving a communication from the host service including a host service identifier of the host service and comparing the received host service identifier with the plurality of host service identifiers stored in the database.

15. The method of claim 14, further comprising the host interface handlers creating a secure, authenticated connection between the wireless router system and one or more of the plurality of host services that are authorized to route data through the wireless router system.

16. The method of claim 15, wherein the secure, authenticated connection is a point-to-point connection.

17. The method of claim 15, wherein the database includes a state entry for each host service identifier, the state entry indicating whether a corresponding host service is connected to the wireless router system.

18. The method of claim 15, wherein the secure, authenticated connection is a TCP/IP connection.

19. The method of claim 15, wherein the secure, authenticated connection is a continuous connection between the wireless router system and the one or more of the plurality of host services, wherein the wireless router system maintains a separate secure, authenticated connection for each of the one or more of the plurality of host services that have connected to the wireless router system.

20. The method of claim 15, wherein the secure, authenticated connection enables the transport of control messages and requested data between the one or more of the plurality of host services and the wireless router system.

21. The method of claim 20, wherein the control messages include acknowledgement messages indicating that requested data has been received.

22. The method of claim 21, wherein the control messages include flow control messages from the wireless router system to the one or more of the plurality of host services, the flow control messages enabling the wireless router system to control the amount of data being transmitted from the one or more of the plurality of host services.

23. The method of claim 22, wherein the flow control messages include messages that control the amount of data being transmitted from the one or more of the plurality of host services for a requesting communication device.

24. The method of claim 15, further comprising providing a firewall system coupled between the wireless router system and the plurality of host services.

25. The method of claim 24, further comprising the firewall system determining if a host service communication is authorized and if so allowing a connection to be established to one of the host interface handlers.

26. The method of claim 25, further comprising the host interface handler performing a key security exchange with the one or more of the plurality of host services to determine if the one or more of the plurality of host services is authorized to route data through the wireless router system.

27. The method of claim 26, wherein the key security exchange is an SSL connection.

28. The method of claim 26, wherein the key security exchange is an HMAC mechanism.

29. The method of claim 15, wherein the requested data received at the wireless router system includes a mobile device identifier, the wireless router system further route the data to a wireless communication device that is associated with the mobile device identifier using the mobile device identifier.

30. The method of claim 29, wherein the wireless router system includes a plurality of network interface adapters for a plurality of wireless networks, each of the network interface adapters providing protocol control for communicating data over one of the plurality of wireless networks.

31. The method of claim 30, wherein the wireless router system includes a plurality of wireless transport handlers for interfacing the host interface handlers with the network interface adapters, each of the wireless transport handlers providing data transfer control to and from a specific remote client computer via one of the network interface adapters.

32. The method of claim 31, wherein for each authorized mobile device identifier, the database includes an indication of the network that the mobile device identifier is associated with and an indication of the current connection status of the communication device that is associated with the mobile device identifier.

33. The method of claim 32, further comprising the wireless router system maintaining a plurality of connections to at least one of the plurality of wireless networks, and the database including an indication as to which connection a particular mobile device identifier is currently associated with.

34. The method of claim 31, wherein the database includes an indication of whether any data is pending for a particular mobile device identifier.

35. The method of claim 31, wherein the wireless router system includes a network backbone for coupling the host interface handlers with the wireless transport handlers.

36. The method of claim 35, wherein the database is coupled to the network backbone.

37. The method of claim 35, wherein the wireless router system includes a work dispatcher, coupled to the network backbone, for assigning a particular host interface handler and a particular wireless transport handler to each mobile device identifier.

38. The method of claim 31, wherein the database includes a table that maps the wireless transport handlers to particular wireless network adapters.

39. The method of claim 31, wherein at least one of the plurality of wireless networks is a GPRS network, one of the network interface adapters being assigned to the GPRS network.

40. The method of claim 39, wherein the network interface adapter assigned to the GPRS network ensures that the one or more communication devices associated with the GPRS network and authorized to route data through the wireless router system have an active PDP context.

41. The method of claim 39, wherein the network interface adapter assigned to the GPRS network monitors DHCP traffic to determine when IP addresses are assigned or unassigned to the one or more communication devices.

42. The method of claim 1, wherein the requested data received at the wireless router system includes a mobile device identifier, the wireless router system further route the data to the communication device that is associated with the mobile device identifier using the mobile device identifier.

43. The method of claim 1, wherein the wireless router system further including a peer-to-peer messaging component that enables wireless communication devices to exchange communication through the wireless router system without having to communicate with a host service.

44. The method of claim 43, further comprising the communication device transmitting an indication and a mobile device identifier to the wireless router system to indicate a peer-to-peer communication.

45. The method of claim 1, wherein the wireless router system includes a billing component that monitors data amount routed through the wireless router system for particular mobile device identifiers and generates billing records.

46. The method of claim 45, further comprising routing data to multiple wireless networks coupled to the wireless router system, and the billing component aggregating any charges associated with said routing data to the multiple wireless networks and generating a consolidated billing record for a particular mobile device identifier.

47. The method of claim 1, wherein the one or more communication devices obtain the associated host service identifiers via a host service registration request.

48. The method of claim 47, wherein the host service registration request occurs via a wireless registration request.

49. The method of claim 47, wherein the wireless router system includes a registration component.

50. The method of claim 49, wherein the one or more communication devices send registration requests for available host services to the registration component of the wireless router system.

51. The method of claim 50, wherein the registration component provides the plurality of host service identifiers in response to a registration request from the communication device.

52. The method of claim 1, wherein the plurality of host service identifiers are manually loaded into the one or more communication devices.

53. The method of claim 1, wherein the plurality of remote client computers are wired or wireless.

54. The method of claim 1, wherein the plurality of remote client computer is wireless or wired remote client computer.

55. A system for routing data according to the method steps of claim 1, the system comprising:
- A plurality of host services;
- A plurality of remote client computers;
- A wireless router system, comprising at least a database storing a plurality of host service identifier of the plurality of host services and a plurality of geographic location identifier of the plurality of remote client computers; and
- A communication device;
- Wherein the wireless router system is coupled with the host service via a communication network and coupled with the plurality of remote client computer via one or more wireless networks.

* * * * *